US007281017B2

(12) United States Patent
Hostetter et al.

(10) Patent No.: US 7,281,017 B2
(45) Date of Patent: Oct. 9, 2007

(54) VIEWS FOR SOFTWARE ATOMIZATION

(75) Inventors: Mathew J. Hostetter, Cambridge, MA (US); Benjamin R. Harrison, Somerville, MA (US)

(73) Assignee: Sumisho Computer Systems Corporation, Tokyo (JP)

( * ) Notice: Subject to any disclaimer, the term of this patent is extended or adjusted under 35 U.S.C. 154(b) by 667 days.

(21) Appl. No.: 10/178,898

(22) Filed: Jun. 21, 2002

(65) Prior Publication Data

US 2003/0236794 A1 Dec. 25, 2003

(51) Int. Cl.
*G06F 17/00* (2006.01)
(52) U.S. Cl. .................. 707/102; 707/101; 707/103 R; 717/136; 717/141
(58) Field of Classification Search ..... 707/100–104.1; 717/136–161
See application file for complete search history.

(56) References Cited

U.S. PATENT DOCUMENTS

| 4,246,638 | A | 1/1981 | Thomas |
| 5,291,601 | A | 3/1994 | Sands |
| 5,446,888 | A | 8/1995 | Pyne |
| 5,586,020 | A | 12/1996 | Isozaki et al. |
| 5,708,811 | A | 1/1998 | Arendt et al. |
| 5,721,907 | A | 2/1998 | Pyne |
| 5,802,367 | A | 9/1998 | Held et al. |
| 5,832,520 | A | 11/1998 | Miller |
| 5,991,765 | A | 11/1999 | Vethe |
| 6,006,034 | A | 12/1999 | Heath et al. |
| 6,112,025 | A | 8/2000 | Mulchandani et al. |
| 6,230,316 | B1 | 5/2001 | Nachenberg |
| 6,243,859 | B1 | 6/2001 | Chen-Kuang |
| 6,279,149 | B1 | 8/2001 | Field et al. |
| 6,317,753 | B1 | 11/2001 | McGrath et al. |
| 6,421,667 | B1 | 7/2002 | Codd et al. |
| 6,421,827 | B1 | 7/2002 | Dimpsey et al. |
| 6,564,219 | B1 * | 5/2003 | Lee et al. .................. 707/100 |

(Continued)

FOREIGN PATENT DOCUMENTS

EP     0 717 353 A2     6/1996

OTHER PUBLICATIONS

International Search Report (International Application No. PCT/US 03/17561) mailed Jun. 3, 2005.

(Continued)

*Primary Examiner*—Isaac Woo
(74) *Attorney, Agent, or Firm*—Finnegan, Henderson, Farabow, Garrett & Dunner, L.L.P.

(57) ABSTRACT

Views for software atomization provide runtime transformations of existing atoms in atom databases to create new or virtual atom databases. Views provide for sharing of code and data atoms that are stored in an atom database, as well as providing sharing of code and data atoms that are loaded into memory. A view is a set of transformation operations, including insert a new atom, modify an existing atom, or delete an existing atom, which can be applied to an atom database. The transformation operations can be applied, either literally, to create a new atom database on disk, or virtually, to create, at runtime, a virtual atom database, without actually having to create an actual atom database on disk. Modifying an existing atom can be done in a variety of ways, including changing the atom bytes, or the atom references, or an attribute of the atom.

19 Claims, 18 Drawing Sheets

U.S. PATENT DOCUMENTS

| | | | |
|---|---|---|---|
| 6,564,223 | B1 | 5/2003 | Sexton et al. |
| 6,601,114 | B1 | 7/2003 | Bracha et al. |
| 6,691,305 | B1 | 2/2004 | Henkel et al. |
| 6,763,397 | B1 | 7/2004 | Bracha et al. |
| 6,971,089 | B2 | 11/2005 | Bates et al. |
| 7,047,521 | B2 | 5/2006 | Bunnell |
| 2002/0073398 | A1 | 6/2002 | Tinker |
| 2002/0143764 | A1* | 10/2002 | Martin et al. ............... 707/8 |
| 2002/0199172 | A1 | 12/2002 | Bunnell |
| 2003/0028862 | A1 | 2/2003 | Bates et al. |
| 2003/0225921 | A1 | 12/2003 | Hostetter et al. |
| 2003/0233491 | A1 | 12/2003 | Bracha et al. |
| 2003/0236794 | A1 | 12/2003 | Hostetter et al. |
| 2004/0015923 | A1 | 1/2004 | Hemsing et al. |
| 2004/0177360 | A1 | 9/2004 | Belslegel et al. |

OTHER PUBLICATIONS

Author Unknown, "Transparent Dynamic Subroutine Loader," IBM Technical Disclosure Bulletin, May 1986, vol. 28, No. 12.

Ho, W. Wilson, et al., "An Approach to Genuine Dynamic Linking," Software Practice and Experience, Apr. 1991, vol. 21, No. 4, Chichester, Sussex, Great Britain.

Fong, Philip, W. L. et al., "Proof Linking: An Architecture for Modular Verification of Dynamically-Linked Mobile Code," BNSDOCID XP-000831185, 1998.

Sirer, Emin Gün, et al., "A Practical Approach for Improving Startup Latency in Java Applications," VNSDOCIS XP-001188167A, Feb. 26, 1999.

S. Liang et al., "Dynamic Class Loading in the Java Virtual Machine," 1998, ACM, pp. 36-44.

M. Sabetella, "Lazy Evaluation of C++ Static Constructors," 1992, ACM SIGPLAN Notices, vol. 27, No. 6, pp. 29-36.

Z. Qian et al., "A Formal Specification of Java Class Loading," 2000, ACM, pp. 325-336.

K. Traub et al., "Overview of the Monsoon Project," MIT, Computation Structures Group Memo 338, Jan. 1991, 7 pages.

N. Gloy et al., "Procedure Placement Using Temporal-Ordering Information," ACM Transactions on Programming Languages and System, vol. 21, 1999, pp. 111-161.

S. Lucco, "Split-Stream Dictionary Program Compression," ACM 2000, pp. 27-34.

C. Krintz, "Reducing Load Delay to Improve Performance of Internet-Computing Programs," University of California, San Diego, 2001, 205 pages.

C. Fraser, "Automatic Inference of Models for Statistical Code Compression," ACM SIGPLAN Conference, 1999, 5 pages.

C. Krintz et al., "Reducing Transfer Delay Using Java Class File Splitting and Prefetching," ACM SIGPLAN Conference, 1999, 16 pages.

S. Liao et al., "Code Density Optimization for Embedded DSP Processors Using Data Compression Techniques," Revised Version for Paper in ARVLSI, 1995, 14 pages.

H. Lekatsas et al., "Random Access Decompression Using Binary Arithmetic Coding," Data Compression Conference, 1999, 10 pages.

J. Ernst et al., "Code Compression," ACM SIGPLAN Conference, 1997, 8 pages.

E. G. Sirer et al., "A Practical Approach for Improving Startup Latency in Java Applications," in Workshop on Compiler Support Systems Software, Feb. 26, 1999, 9 pages.

"Software AG and Birdstep Technology ASA sign Strategic Cooperation Agreement," Press Releases, http://www.softwareag.com/corporat/news/archive99_2000/nov2000/birdstep_e.htm, retrieved on Feb. 15, 2002, 2 pages.

"Birdstep Database Engine," WindRiver, http://www.windriver.com/products/html/birdstep.html, retrieved on Feb. 15, 2002, 3 pages.

"QNX RTOS v 6: A Core Technology of the QNX Realtime Platform," http://www.qnx.com/products/os/rtos6.html, retrieved on Feb. 15, 2002, 8 pages.

"Birdstep Technology Releases Its Ultra-Small Footprint Birdstep Database Engine™ for the QNX® Realtime Platform," http://www.qnx.com/news/tpnews/sep26_00-bird.html, retrieved on Feb. 15, 2002, 2 pages.

D. Moldoff, "The Emerging Trends in Application Integration," http://www.abtcampus.com/includes/MainBody/News/White%20papers/White_Trends.htm, retrieved on Feb. 7, 2002, 9 pages.

"Alternative Atomization," http://research.microsoft.com/specncheck/docs/field/indexp16.htm, retrieved on Feb. 15, 2002, 1 page.

"Alternative Atomization," http://research.microsoft.com/specncheck/docs/field/indexp17.htm, retrieved on Feb. 15, 2002, 1 page.

"Alternative Atomization," http://research.microsoft.com/specncheck/docs/field/indexp18.htm, retrieved on Feb. 15, 2002, 1 page.

"Alternative Atomization," http://research.microsoft.com/specncheck/docs/field/indexp19.htm, retrieved on Feb. 15, 2002, 1 page.

"Aggregate Structure Identification and its Application to Program Analysis," http://www.research.ibm.com/people/t/tip/abstracts/agg-abstract.html, retrieved on Feb. 15, 2002, 1 page.

C. K. Chang et al., "Function-Class Decomposition: a Hybrid Software Engineering Method," Computer, vol. 34, Issue 12, Dec. 2001, pp. 87-93.

R. Lutz, "Evolving Good Hierarchical Decompositions of Complex Systems," Journal of Systems Architecture, vol. 47, Issue 7, Jul. 2001, pp. 613-634.

G. Canfora et al., "Decomposing Legacy Programs: a First Step Towards Migrating to Client-Server Platforms," Journal of Systems and Software, vol. 54, Issue 2, Oct. 2000, pp. 99-110.

D. Theotokis et al., "Distributed Information Systems Tailorability: a Component Approach," Distributed Computing Systems, Proceedings 7th IEEE Workshop on Future Trends, 1999, pp. 95-101.

* cited by examiner

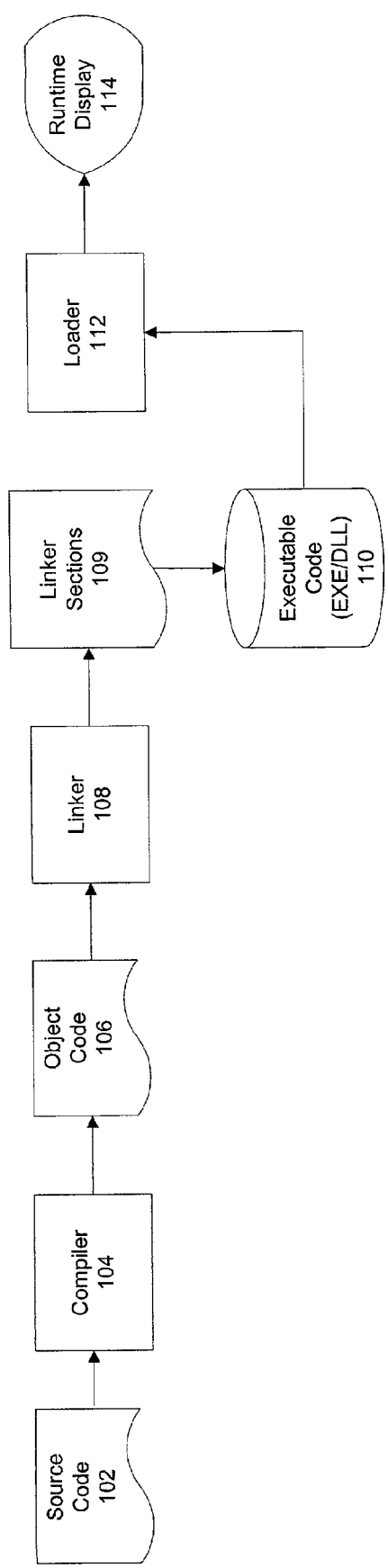
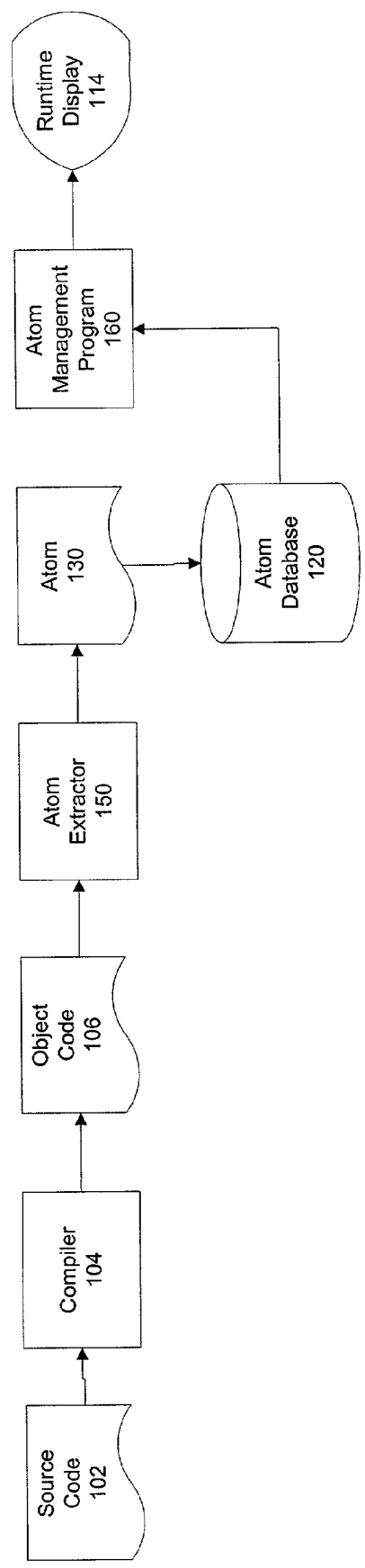
Fig. 3 (Prior Art)
Fig. 4

Fig. 12 atom-offset-sequence 390

| first-atom-file-offset 392 |
| --- |
| delta-coded-file-offset-array 394 |

Fig. 13 encoded-atom 395

| atom-flags 396 |
| --- |
| atom-num-info 397 |
| encoded-atom-references 398 |
| encoded-raw-atom-bytes 399 |

Fig. 14 encoded-atom-reference 398

| atom-ref-type 402 |
| --- |
| source-offset-delta 404 |
| dest-offset 406 |
| dest-atom-id 408 |

Fig. 9 atom database 120

| DB-header 350 |
| --- |
| atom-map 360 |
| atom-map 360 |
| ... |

Fig. 10 atom-map-header 370

| default-atom-sequence-delta 372 |
| --- |
| atom-offset-sequence-array size 374 |
| atom-offset-sequence-array-offset 376 |
| atom-map-data-offset 378 |

Fig. 11 atom-map-array 380

| first-id 382 |
| --- |
| sequence-size 384 |
| sequence-offset 386 |
| first-id 382 |
| sequence-size 384 |
| sequence-offset 386 |
| ... |

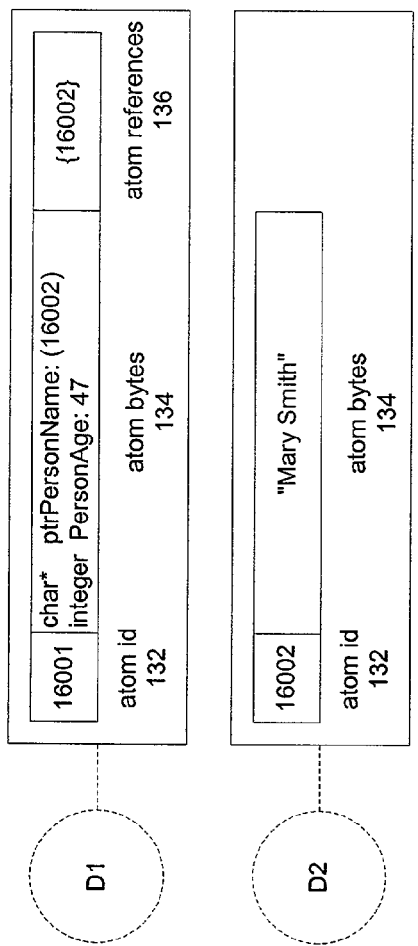
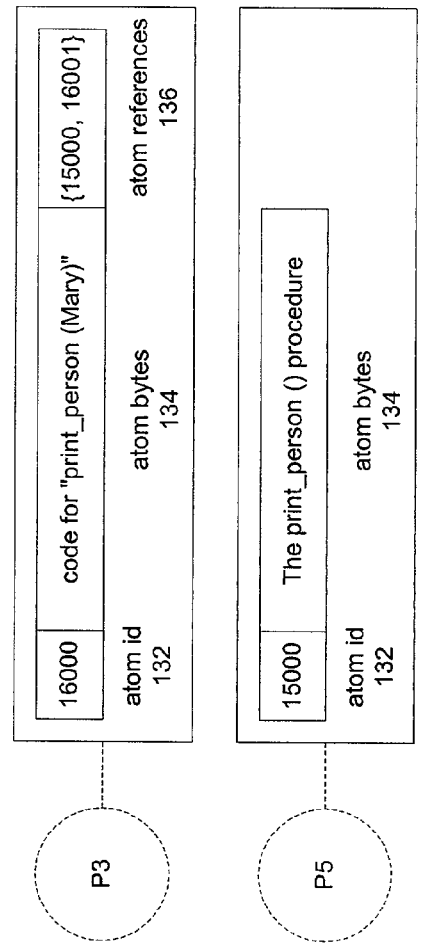
Fig. 16a
Fig. 16b

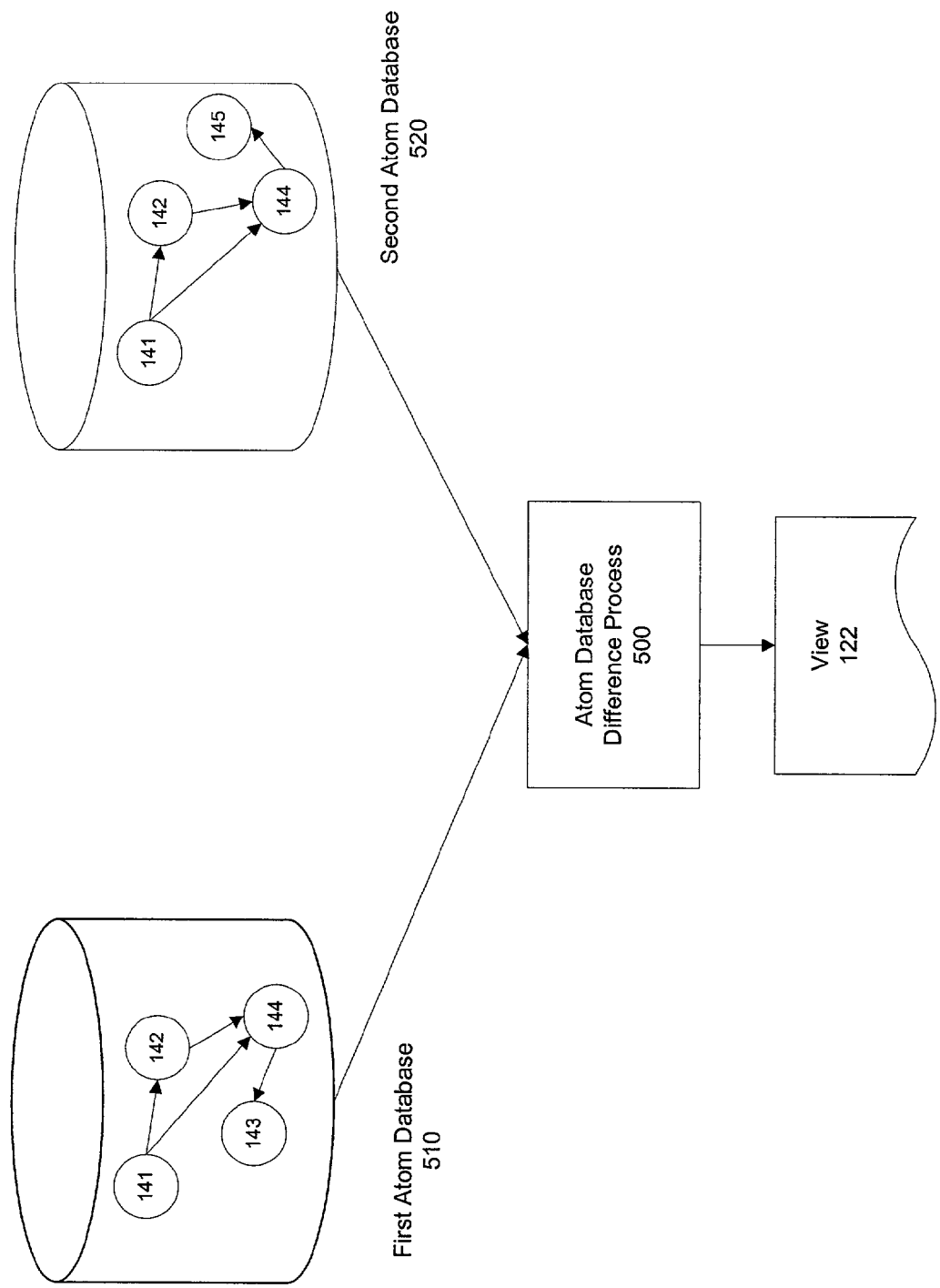

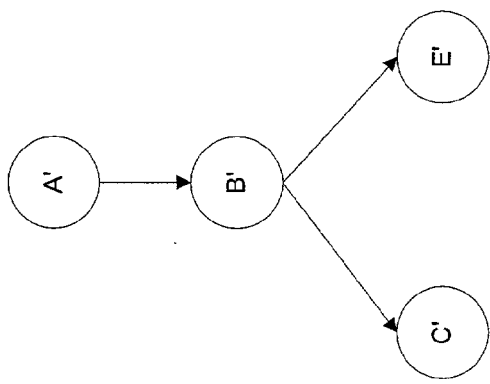
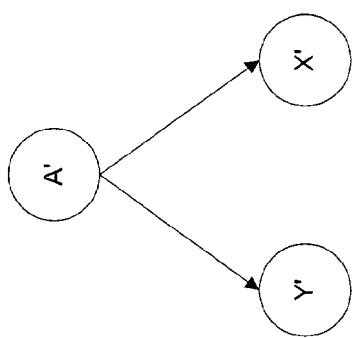
Fig. 17b
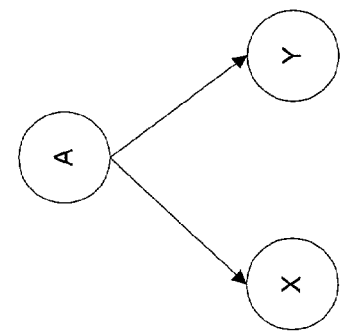
Fig. 17c

VIEWS FOR SOFTWARE ATOMIZATION

BACKGROUND OF THE INVENTION

Computer software is generally created for interpreted language systems or compiled language systems. Interpreted language systems translate high-level program statements into executable form and execute one statement at a time rather than completely translating (i.e., compiling) the high-level statements before execution. Basic, LISP and APL are generally implemented as interpreted languages. Compiled language systems translate high-level program statements into an intermediate, object code, format prior to execution. In compiled language systems program statements are written in a source code programming language (e.g., C, C++). Source code contains human-readable program statements written in a high-level or assembly language that is not directly executable by a computer. The source code is processed by a compiler which transforms the source code into object code (e.g., .OBJ files) by following a set of syntactic and semantic rules. The object code is then linked together using a linker to produce an executable computer program (e.g., an .EXE file).

Executable computer programs can be very large in size, both as stored on disk and when loaded into computer memory. Dynamic link libraries ("DLL") provide a mechanism to store executable routines and data separate from the main executable computer program. The executable routines can be loaded on demand needed by the executable computer program. DLLs conserve space by only using memory when a routine or data is used. DLLs also provide for organization and management of computer code and data separate from the executable computer program and also separate from other DLLs. This allows a programmer to make corrections or improvements to only certain routines in a DLL without affecting the operation of the calling computer program or any other DLL and without requiring the recompilation of the calling program or any other DLL. Additionally, DLLs can be shared among multiple computer programs. DLLs themselves can be quite large and multiple executable routines and due to their monolithic nature DLLs are not very granular in terms of downloading, updating and loading.

Techniques exist for minimizing the transfer time associated with updating large DLLs or other code/data. File transfer protocols using a difference detection algorithm (e.g., rsync) can reduce transfer time. These algorithms can arrange source and target files into blocks of data, analyze the blocks, and only transfer the blocks that are not identical between the source and target files.

Compression can also be used to reduce transfer time of code and data both over communications media as well as from disk to memory. Embedded processor systems, which are especially sensitive to executable code size, have been implemented that implement compression for executable code. A compressed "wire" representation of code can be used, but the code must be decompressed before execution. Other techniques provide for direct execution of compressed code (e.g., "byte-coded RISC" or "BRISC" virtual machines).

The Curl™ language combines layout, scripting and programming capabilities in one integrated environment. By pairing this fully featured language with client side execution, Curl™ technology delivers fast, efficient, highly functional applications over the Web, and enables interactive Web services capabilities in which the client and server can interoperate. Curl™ content is displayed using a Web browser augmented with a Curl™ plug-in and a Curl™ runtime environment. The Curl™ runtime environment is atypical of many runtime environments in that it is compiled from approximately equal amounts of code and data. The Curl™ runtime environment is implemented using a large number of DLLs.

SUMMARY OF THE INVENTION

Computer systems comprised of large executable programs and/or large shared libraries (DLLs) present capacity problems when stored on disk, as well as when loaded into memory. Additionally, updates/patches to these systems require extended bandwidth when shipped and often result in multiple, nearly identical copies of code and/or data being stored at the client site. This is especially true as the computer systems evolve through various incremental releases, with users requiring support for multiple releases simultaneously.

Views of atom databases offer solutions to these problems by providing runtime transformations of existing atoms in atom databases to create new or virtual atom databases. Views provide for sharing of code and data atoms that are stored in an atom database, as well as providing sharing of code and data atoms that are loaded into memory. Atoms are fine-grained, addressable units of code or data comprising a permanent identifier, code/data bytes and references to other atoms. The atoms are stored in an atom database. This patent application is related to co-pending U.S. patent application Ser. No. 10/161,964, "Software Atomization" by Mathew J. Hostetter and Benjamin R. Harrison, filed Jun. 3, 2002, the entire teachings of which are incorporated herein by reference.

A view is a set of transformation operations, including insert a new atom, modify an existing atom, or delete an existing atom, which can be applied to an atom database. A reuse operation is implicit, for neither modified nor deleted atoms. The transformation operations can be applied, either literally, to create a new atom database on disk, or virtually, to create, at runtime, a virtual atom database, without actually having to create an actual atom database on disk. Modifying an existing atom can be done in a variety of ways, including changing the atom bytes, or the atom references, or an attribute of the atom. The view can even be applied destructively, to modify an atom database in place, if desired.

The different types of view transformations have various advantages and disadvantages. Applying a view virtually, to create a virtual atom database, requires less disk space to store the atoms, but is slower at runtime, as the transformation operations are done each time an atom is loaded. A benefit is that the transformation info is retained, and can be used to share atoms between various views. Applying a view literally, to create a new atom database, requires more disk space, but is faster at runtime, as the transformations will have already been applied. This allows direct loading of the transformed atom, but the ability to share atoms between various views is lost. Even though the atom database can't be shared, each executable can run with different copy of the atom database. Applying a view literally, to overwrite an existing atom database saves disk space, and is faster at runtime, but once the transformations are applied, transformation information is lost, therefore the atom database can no longer be shared between different views. No single option is best for all situations. Each computer program environment must balance the advantages and disadvantages of the various view options in order to select the best overall solution to the satisfy the specific performance requirements.

A mapping table is a simple form of view, in which the only operations are modify operations, and in which those modify operations can only replace the atom bytes and atom references of an existing atom with the atom bytes and atom references of another atom (known as a replace operation). It can be used to (literally or virtually) completely replace an existing atom with another atom, while maintaining the same atom id. This allows for any other atoms which might have atom references to the old atom to "automatically" reference the atom which replaced it instead. Because mapping tables replace an existing atom with another atom they can perform arbitrarily interesting modify operations, such as, transforming some atom bytes from English to Japanese, or change some atom references from lazy to eager.

A method of creating a view of an atom database comprises defining a set of transformation operations and applying the set of transform operations to the atom database. When the transformation operations are applied virtually, at runtime, a virtual atom database is created, and when the transformation operations are applied literally a new atom database is created. The atom database stores atoms, the atoms comprise a permanently assigned atom identifier, computer code and/or data, and references to other atoms. The new atom database can be stored in a separate file from the atom database, or can replace the original atom database. The transformation operations comprise an insert operation to insert a new atom, a modify operation to modify an existing atom, and/or a delete operation to delete an existing atom.

Views can be used to share atoms in an atom database in a variety of ways. A single view can be used to share atoms stored in an atom database by associating that view and the atom database with a first executable program and a second executable program. The atom database is transformed virtually at runtime using the view to create a virtual atom database. An atom from the virtual atom database is then loaded by the first executable program and the second executable program, thereby sharing the atom between the first executable program and the second executable program. Sharing on disk is provided when the atom is loaded into a first memory buffer accessible by the first executable program and the atom is loaded into a second memory buffer accessible by the second executable program. Sharing in memory is provided when the atom is loaded into a memory buffer accessible by both the first executable program and the second executable program.

Multiple views can be used to share atoms stored in an atom database by associating a first view and the atom database with a first executable program and a second view and the atom database with a second executable program. The atom database is transformed virtually at runtime using the first view and the second view to create a first virtual atom database and a second virtual atom database. An atom from the atom database is loaded by the first executable program using the first view and the second executable program using the second view, thereby sharing the atom between the first executable program and the second executable program. Sharing on disk using multiple views is provided when the atom is loaded into a first memory buffer accessible by the first executable program using the first view and the atom is loaded into a second memory buffer accessible by the second executable program using the second view. Sharing in memory using multiple views is provided when the atom is loaded into a memory buffer accessible by both the first executable program using the first view and the second executable program using the second view for atoms that are not affected by either view (i.e., they are non-modified).

Views can be used for many purposes. Transform operations can be defined based on an optimization feature of a computer hardware and/or software system on which the atoms will execute in order to customize performance. Transform operations are defined in order to limit access to certain features provided by the atoms in order to provide releases with customized feature sets.

Atoms can further comprise an atom characteristic and the atom transform operations can change the atom characteristic. For example, a code atom can be transformed by modifying its debug information.

The set of transform operations can be applied to a virtual atom database in order to apply a view on top of a view.

Mapping tables are a simple view wherein the set of transformation operations comprise only modify operations that replace a first atom with a second atom. The replace operation is a simple, but powerful mechanism that provides for effectively changing all references from one atom to another atom.

The set of atom transformation operations that comprise a view can be created by a programmer manually or can be generated automatically by a process. A method for creating a set of atom transformation operations for transforming a first atom database to a second atom database comprises canonicalizing, using a standard atom sharing algorithm, the first atom database and the second atom database, where each of the first atom database and the second atom database storing atoms comprise a permanently assigned atom identifier, computer code and/or data and references to other atoms. A set of goal merges between atoms of the first atom database and atoms of the second atom database is identified. *A set of assist merges between atoms of the first atom database and atoms of the second atom database that assist the goal merges is identified. The steps of selecting a best merge in the set of assist merges, committing the selected best merge, updating the set of goal merges, and updating the set of assist merges is repeated while the set of goal merges is not empty.

Each committed merge that is not a reuse merge or did not assist with a committed reuse merge is undone. If uniquely compatible merges were created, add the uniquely compatible merges to the goal merges, assign an infinite weight to one of the uniquely compatible merges and goto the step in which a set of assist merges is identified. A modified atom sharing algorithm using the first database and the second database is applied in order to identify remaining isomorphisms. If uniquely compatible merges were created, add the uniquely compatible merges to the goal merges, assign an infinite weight to one of the uniquely compatible merges and goto the step in which a set of assist merges is identified. If any compatible merges were created, commit the compatible merge with the largest weigh, assign an infinite weight to the committed compatible merge, add the committed compatible merge to the set of goal merges and goto the step in which a set of assist merges is identified. The committed merges can comprise a modify/replace merge, an insert merge and/or a delete merge. These merges are the actual transformation operations in a view.

Sharing code and data across releases provides savings in both disk storage and memory usage. Allowing code and data to be shared across releases also provides for maintaining separate releases and avoiding the manual creation of "wrapper" interfaces between releases. The motivation for wrappers is to create backwards compatible versions of new code so that older versions of the code no longer need to be maintained on the client. Wrappers are an attempt to avoid the overhead of multiple versions of a program, each containing large bodies of essentially identical code. Views for software atomization, by allowing code and data to be shared automatically between versions of a program, eliminates the need for wrappers and allows more architectural freedom in the design of software program versions.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 3 illustrates a conventional process for creating and loading a computer program to display output at runtime.

FIG. 4 illustrates a software atomization process for creating and loading an atomized computer program to display output at runtime.

FIG. 9 is a diagram of an atom database data structure.

FIG. 10 is a diagram of an atom map header data structure.

FIG. 11 is a diagram of an atom map array data structure.

FIG. 12 is a diagram of an atom offset sequence data structure.

FIG. 13 is a diagram of an encoded atom data structure.

FIG. 14 is a diagram of an encoded atom reference data structure.

FIG. 16a is a diagram of example data atoms.

FIG. 16b is a diagram of example code atoms.

FIG. 17a is a diagram of an atom database difference process.

FIG. 17b is a diagram of graphs representing an old atom database and a new atom database.

FIG. 17c is a diagram of graphs representing an alternative old atom database and new atom database.

DETAILED DESCRIPTION OF THE INVENTION

A description of preferred embodiments of the invention follows. The preferred embodiments are suitable for atomizing a computer program implementing the Curl™ runtime environment executing appropriate parts of the atomized Curl™ runtime to process software written in the Curl™ language, scripts or non-Curl programs.

Figure 1:
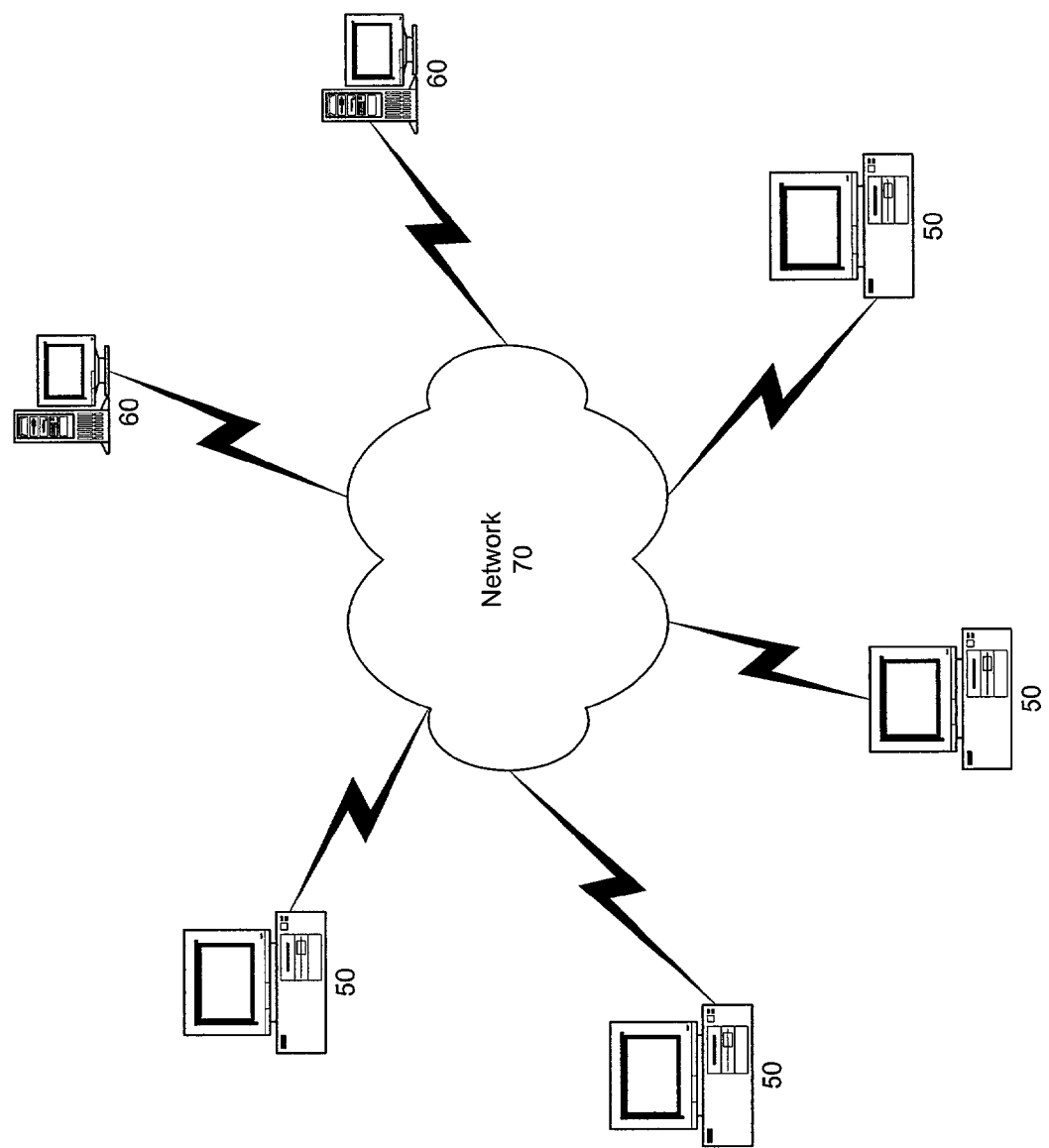
FIG. 1 is a diagram of a computer system on which an embodiment of the present invention is implemented.

FIG. 1 is a diagram of a computer system on which an embodiment of the present invention is implemented. Client computer 50 and server computer 60 provide processing, storage, and input/output devices for atomizing and executing atomized computer programs. The client computers 50 can also be linked through a communications network 70 to other computing devices, including other client computers 50 and server computers 60. The communications network 70 can be part of the Internet, a worldwide collection of computers, networks and gateways that currently use the TCP/IP suite of protocols to communicate with one another. The Internet provides a backbone of high-speed data communication lines between major nodes or host computers, consisting of thousands of commercial, government, educational, and other computer networks, that route data and messages. In another embodiment of the present invention, the processing, storage, and input/output devices for atomizing and execution of atomized computer programs can be implemented on a stand-alone computer.

Figure 2:
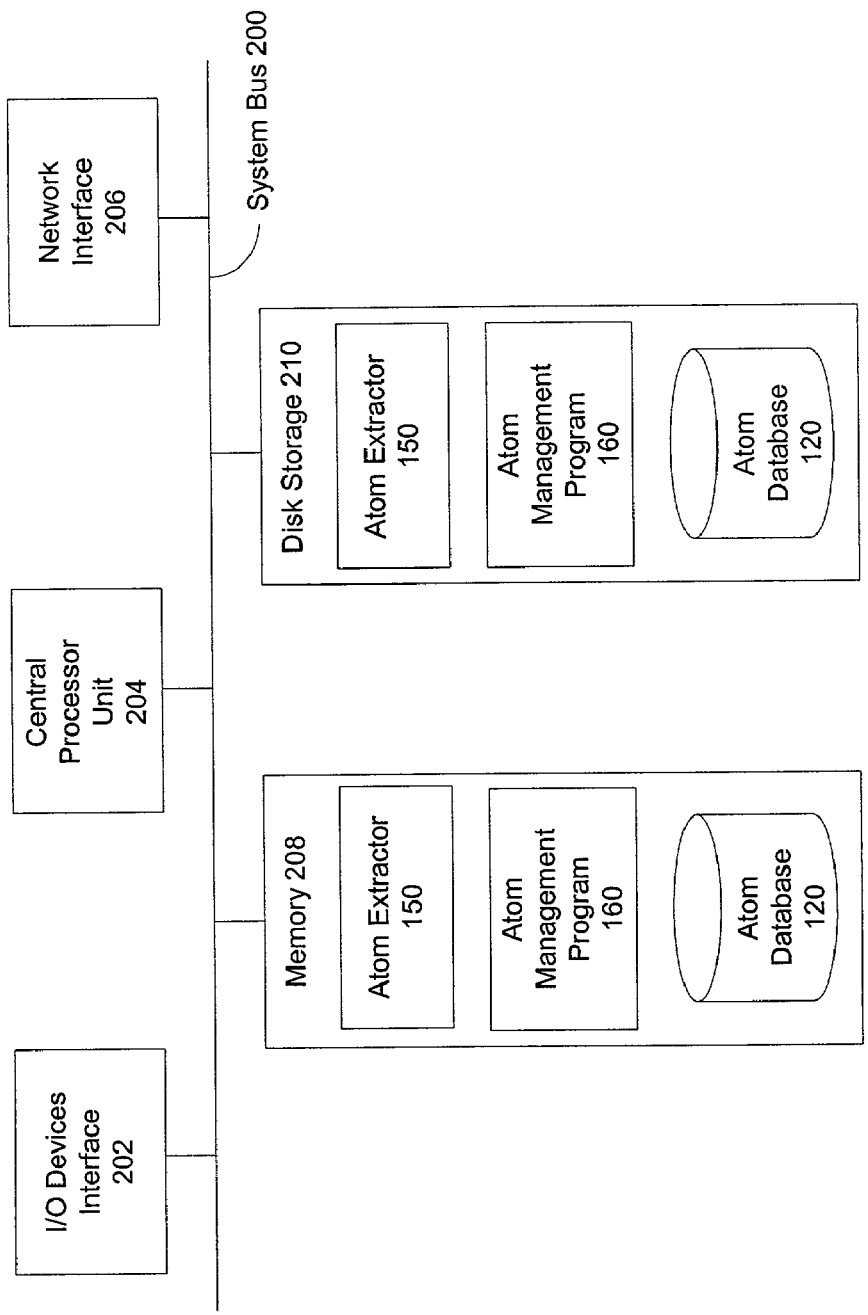
FIG. 2 is a diagram of the internal structure of a computer in the computer system of FIG. 1.

FIG. 2 is a diagram of the internal structure of a computer (e.g., 50, 60) in the computer system of FIG. 1. Each computer contains a system bus 200, where a bus is a set of hardware lines used for data transfer among the components of a computer. A bus 200 is essentially a shared conduit that connects different elements of a computer system (e.g., processor, disk storage, memory, input/output ports, network ports, etc.) that enables the transfer of information between the elements. Attached to system bus 200 is an I/O device interface 202 for connecting various input and output devices (e.g., displays, printers, speakers, etc.) to the computer. A network interface 206 allows the computer to connect to various other devices attached to a network (e.g., network 70). A memory 208 provides volatile storage for computer software instructions (e.g., atom extractor program 150 and atom management program 160) and data structures (e.g., atom database 120) used to implement an embodiment of the present invention. Disk storage 210 provides non-volatile storage for computer software instructions (e.g., atom extractor program 150 and atom management program 160) and data structures (e.g., atom database 120) used to implement an embodiment of the present invention.

A central processor unit 204 is also attached to the system bus 700 and provides for the execution of computer instructions (e.g., atom extractor program 150 and atom management program 160), thus allowing the computer to atomize and execute atomized computer programs.

FIG. 3 illustrates a conventional process for creating and loading a computer program to display output at runtime. Source code 102 is produced by a computer programmer using a source code programming language (e.g., C, C++). A compiler 104 processes the source code and produces object code 106 files. One or more object code 106 files are linked, using linker 108 to produce linker sections 109. The linker sections 109 are combined to produce executable code 110. Executable code 110 can be linked as standalone executable programs (e.g., .EXE files) or as shared libraries of code (e.g., .DLL files). The executable code 110 is loaded into memory by a loader 112 for execution in order to produce a runtime display 114.

FIG. 4 illustrates a software atomization process for creating and loading an atomized computer program to display output at runtime. As with the conventional process, source code 102 is produced by a computer programmer using a source code programming language (e.g., C, C++). A compiler 104 processes the source code and produces object code 106 files. After source code 102 has been compiled into object code 106 files in the usual manner, the atom extractor 150 processes the object code 106 files to identify the atoms 130. The fine-grained, individually addressable atoms 130 are placed into an atom database 120, with each atom 130 receiving a unique atom id 132. Fine-grained atoms 130 provide for the definition of code and data of any integral number of bytes. References to code and data are converted into atom id references. For example, procedure calls within the code are converted to invocations of other atoms 130 via their atom ids 132. Data references are also converted to data atom references via their atom ids 132.

The atom extractor 150 walks over the object code files 106 and creates atoms 130 from the code. Information needed to extract atoms 130 from the object code 106 is already embodied in the object files, by virtue of the fact that a conventional loader needs the same information in order to load and invoke procedures and optimize read-only data. Information needed to extract multiple data atoms from object code files 106 requires separation of various data quantities. The separation can be done automatically by some conventional compilers (e.g., gcc), or explicitly by a programmer marking data quantities directly in the source code (e.g., compiler directives). At runtime an atom management program 160 accesses atoms 130 from atom database 120 and loads them into memory for execution. The loaded atoms 130 can then produce a runtime display 114, or any other result for which they are programmed, when executed. The atom management program 160 can determine an optimal order for loading atoms 130 based on static code analysis or dynamic profiling. By relying on the compiler to create separate sections within object code files 106 the process of atomization can be made automatic, avoiding the need for manual decomposition and analysis. Use of a compiler provides one option for the creation of separate sections of code and data, alternatively other programs can be used to process source files to produce atoms 130.

Figure 5:
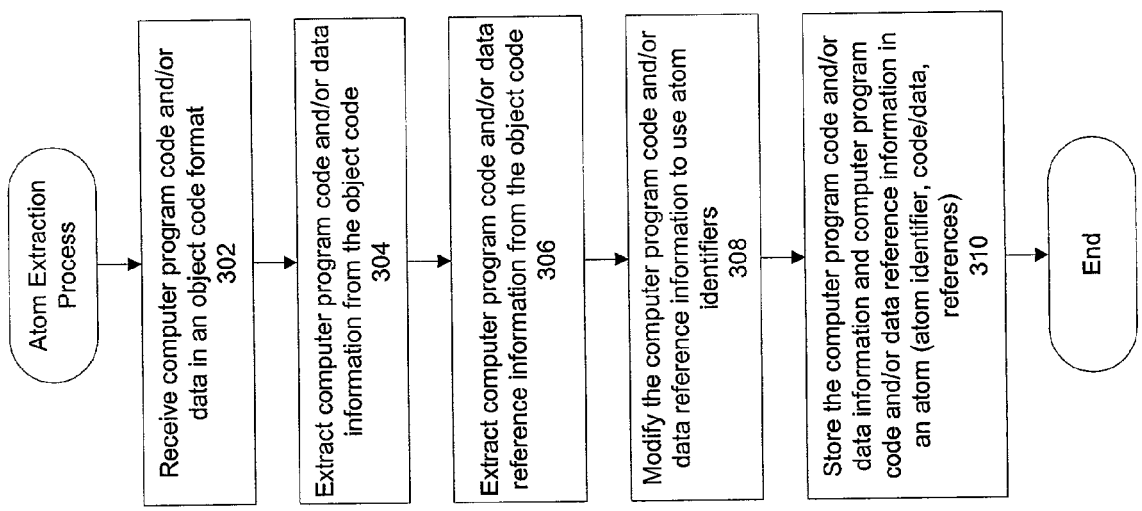
FIG. 5 illustrates an atom extraction process.

FIG. 5 illustrates an atom extraction process. At step 302 computer program code and/or data is received in an object code format. At step 304 computer program code and/or data information is extracted from the computer program code and/or data in an object code format. At step 306 computer program code and/or data reference information is extracted from the computer program code and/or data in an object code format. At step 308 the computer program code and/or data reference information is modified to use atom identifiers. Finally, at step 310 the computer program code and/or data information and computer program code and/or data reference information is stored in an atom comprising: an atom identifier; computer program code and/or data information; and computer program code and/or data reference information.

Figure 6A:
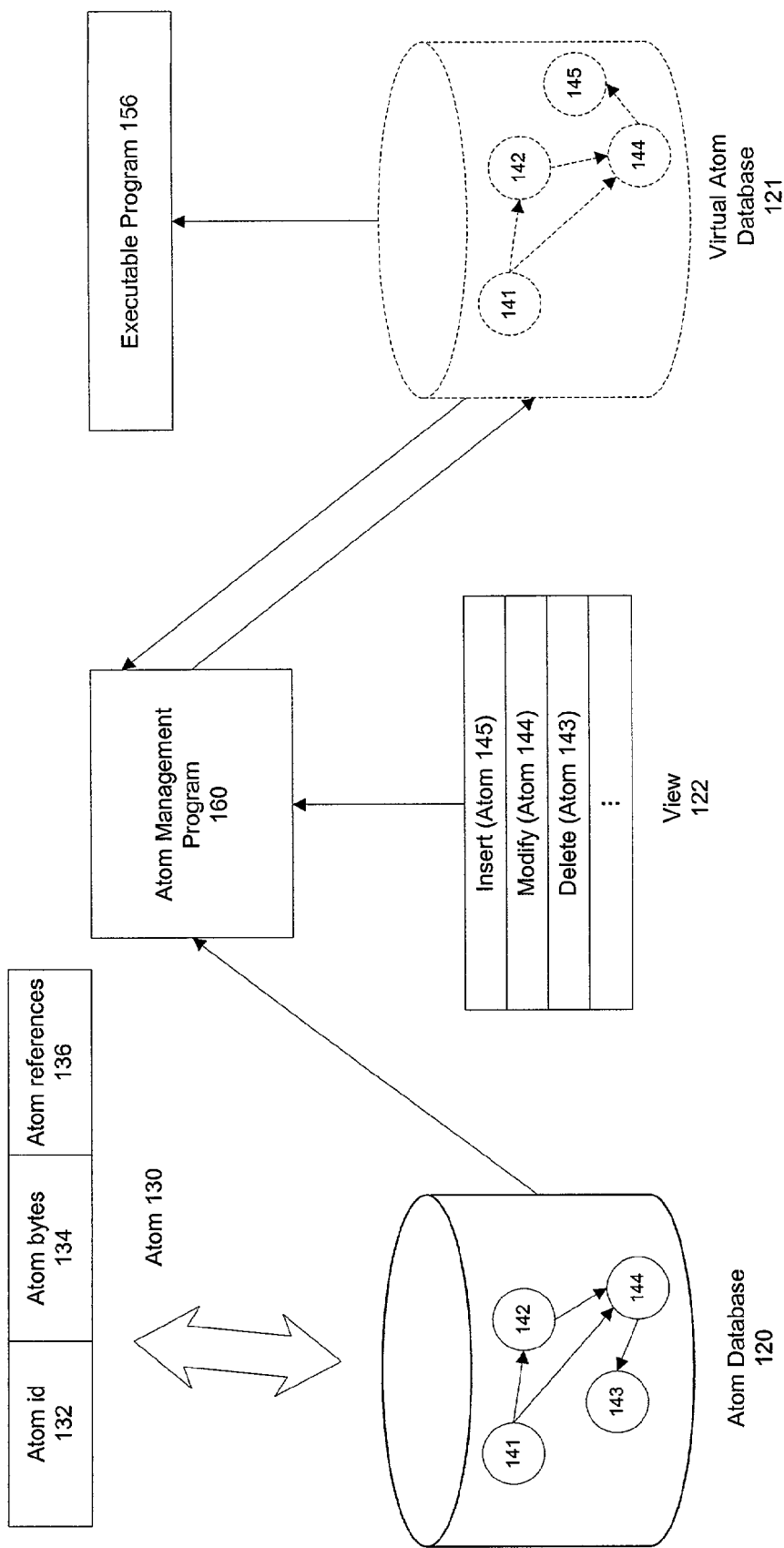
FIG. 6a is a diagram of an atom, an atom database, a view and a virtual atom database.

FIG. 6a is a diagram of an atom, an atom database, a view and a virtual atom database. Conceptually, atom database 120 can be viewed as a directed graph of atoms 130. Atom bytes 134 (node) are identified by atom id 132 (node id) and linked by atom references 136 (edges). Atom database 120 stores atoms 130. Each atom 130 is identified by a unique atom id 132. The code and/or data for each atom 130 is represented as atom bytes 134. The atoms 130 can be compressed, including the code and/or data within the atom bytes 134 and the atom references 136. In certain enviromnents decompression is faster than disk-read time and the compression and decompression process provides significant performance improvements as well as reduced memory and disk storage space. An atom database 120 storing atoms (e.g., atoms 141, 142, 143, 144) can be transformed virtually into a virtual atom database 121 storing atoms (e.g., 141, 142, 143, 144, 145, 146) through the use of transform operations. An insert operation adds atom 146 and a replace operation replaces atom 143 with atom 145 (such that atom 144 now calls atom 145). Programs (e.g., executable program 158) accessing the atom database 120 through view 122 (i.e., accessing virtual atom database 121) will access an atom 144 calling atom 145, whereas an executable program 156 accessing atom database 120 directly will access an atom 144 calling atom 143. In this way, multiple versions/release of atom software can be maintained without having to store extra copies of identical atoms (e.g., 141, 142).

Atoms 130 are code snippets or data elements which are uniquely identified by a permanent atom id 132 (identifier). Code atoms 130 are typically on the order of a source language (e.g., C/C++) procedure. Data atoms 130 are data elements and can be of any size. An atom 130 is pulled into memory (e.g., Read-only Code Buffer 170, Read-only Data Buffer 180, Read-write Data Buffer 190) when needed and can be swapped out when no longer needed. The permanent nature of the atom ids 132 provides an ability to engineer new releases based on existing releases by determining that certain atoms 130 already exist and are identified by permanent atom ids 132. This provides for incremental releases based on deltas from existing releases.

An atom 130 in an atom database 120 can be modified to affect a desired programming change (e.g., to update code, data, references, and/or characteristics). One important subset of modify operations is a replace operation in which one atom 130 is replaced by another atom 130 using a view 122 to provide for on-disk, and/or in-memory, sharing of atoms 130. Replacing atoms allows code and/or data that references an atom 130 to remain unchanged when the referenced atom is replaced or updated with a different atom 130. A view 122 can transform a reference from one atom id 132 to another atom id 132. The view 122 can also contain transformation operations that affect other data, references and/or characteristics of an atom 130.

Multiple views 122 can be defined on an atom database 120, allowing executable programs 156 to access and share the atoms 130 in various ways. In this way an executable program 156 utilizing views for atomization could execute against a particular view 122 of an atom database 120. For example, a view 122 and atom database 130 can be associated with and executable program 156 through the execution command line "MyApplication.exe-dATOM.DB-v1.1". The executable program 156 "MyApplication.exe" can include a stub to invoke an atom loader (e.g., Atom Management Program 160) to access the atoms 130 defined in the view version "1.1" as created using the view 122 defined in view file "1.1".

Creating the transformation operations of view 122 involves producing a set difference of atoms 130 from one atom database 120 to another atom database 120. Because atoms 130 can be shared among various views 122, multiple releases/versions of a product can be maintained using a single atom database 120.

New releases of computer software can be encoded into views 122 that contain transformation operations. The transformation operations can define the differences between two physical atom databases 120, between or a virtual database 121 and a physical atom database 120, or between a pair of virtual atom databases 121. In this way, software release can be built upon previous software releases.

Figure 6B:
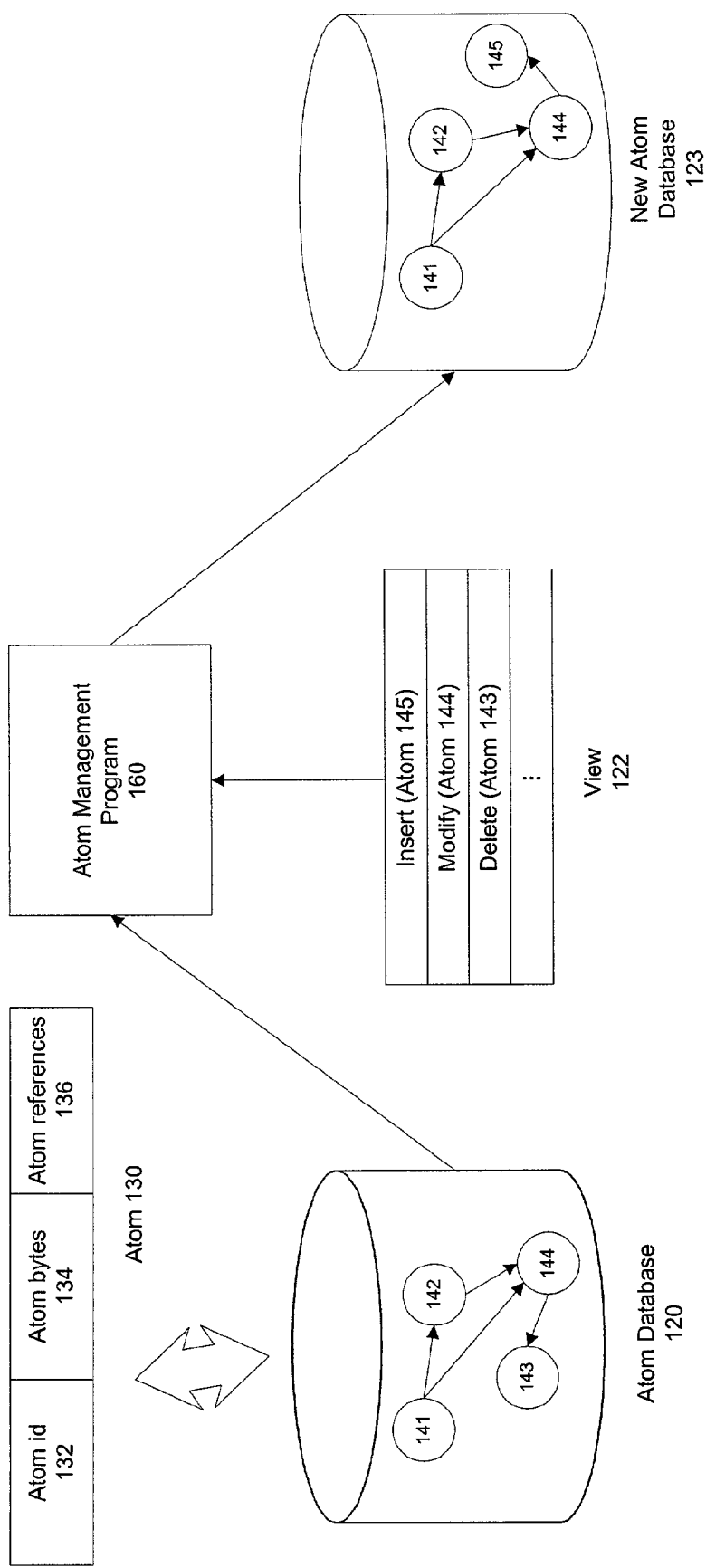
FIG. 6b is a diagram of an atom, an atom database, a view and a separate new atom database.

FIG. 6b is a diagram of an atom, an atom database, a view and a separate new atom database. A view 122 can transform an atom database 120 into a new atom database 120. In the case described in the discussion of FIG. 6a, the transformation created a virtual atom database 121 by transforming atom references, data and/or characteristics as the atoms were accessed and loaded into memory. That same process can be used to create a new physical atom database 123. In this way the transformation operations need only be performed once and a separate new atom database 123 is created with an image of the transformed atoms 130. The separate new atom database 123 stores copies of all atoms 130 from atom database 120 that are reused (neither modified nor deleted), stores all new atoms 130 inserted as a result of insert operations and stores atoms 130 modified as a result of modify operations. The separate new atom database 123 provides another non-destructive way in which to update an atom database 120.

Figure 6C:
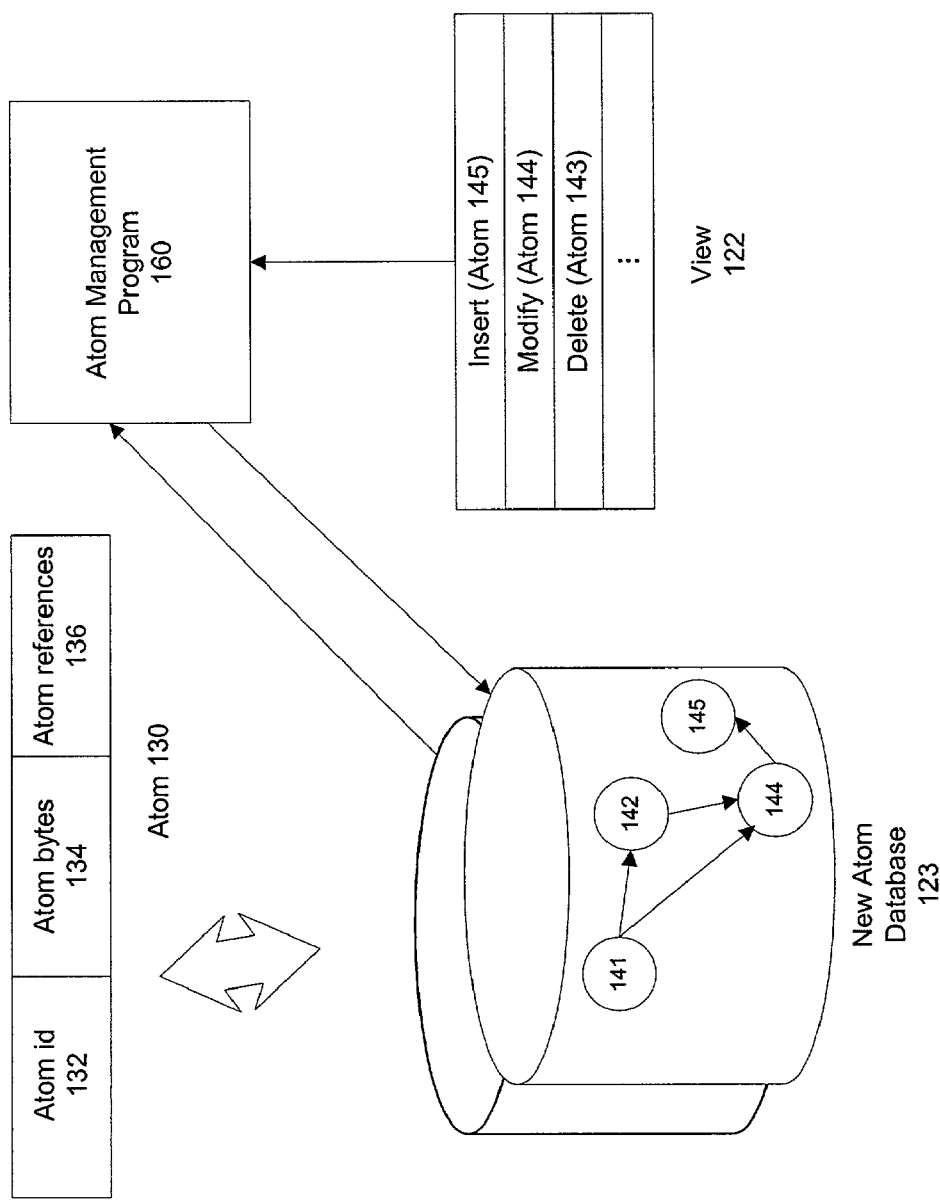
FIG. 6c is a diagram of an atom, an atom database, a view and an overwritten new atom database.

FIG. 6c is a diagram of an atom, an atom database, a view and an overwritten new atom database. A view 122 can transform an atom database 120 into a new atom database 120. The new atom data base 120 can be a virtual atom database 121 (as shown in FIG. 6a) or a separate new atom database 123 (as shown in FIG. 6b). The new atom database 120 can also overwrite the existing atom database 120 to create an overwritten new atom database 123. As with the separate new atom database 123, the transformation operations need only be performed once and the overwritten new atom database 123 is created with an image of the transformed atoms 130. The overwritten new atom database 123 retains copies of all atoms 130 from atom database 120 that are reused (neither modified nor deleted), stores all new atoms 130 inserted as a result of insert operations and stores atoms 130 replaced as a result of replace operations. Delete operations can be performed to remove unused atoms from the overwritten atom database 123. The overwritten new atom database 123 provides a destructive way in which to update an atom database 120.

Figure 7A:
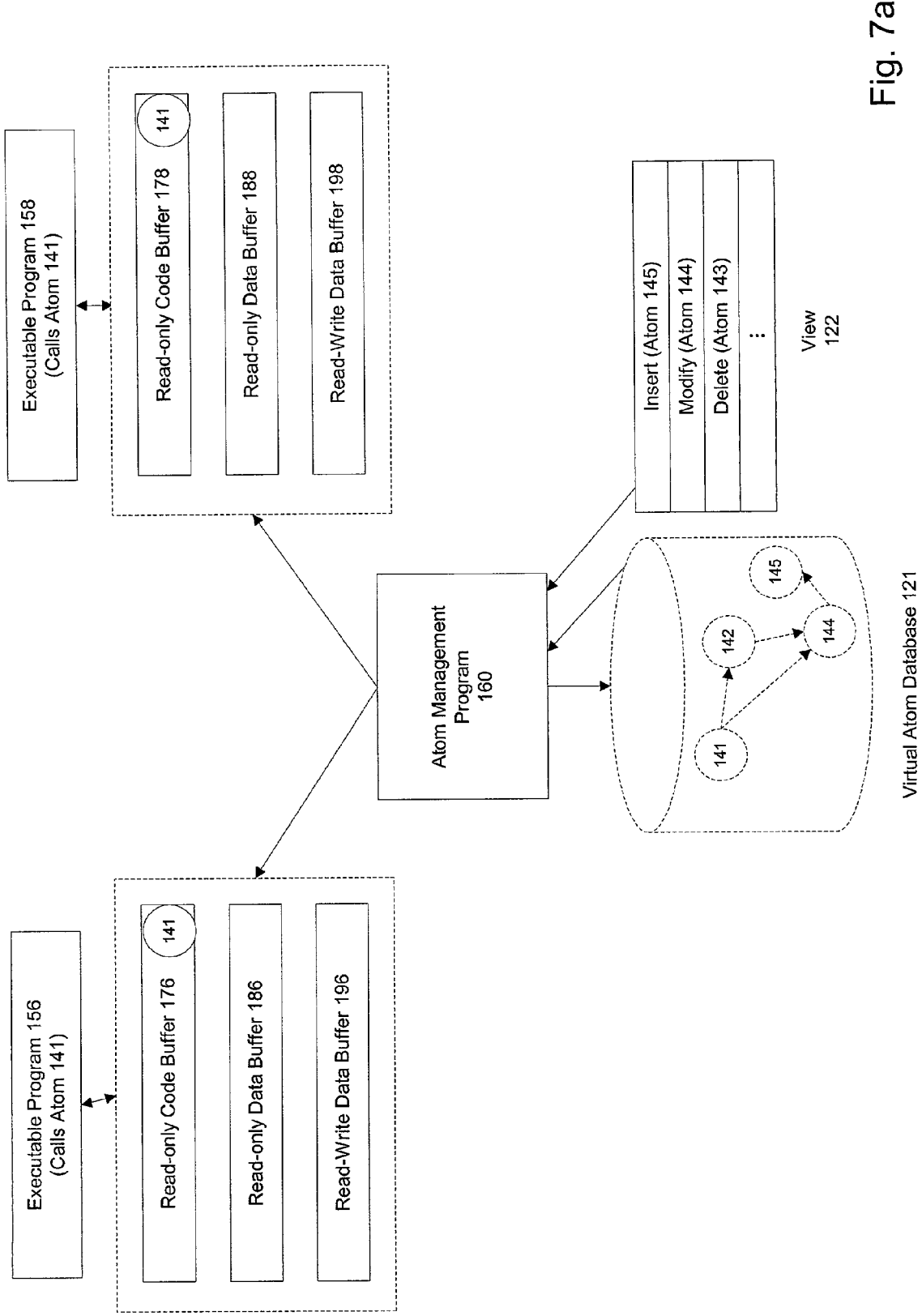
FIG. 7a is a diagram of multiple executable programs using a single view and sharing an atom on disk.

FIG. 7a is a diagram of multiple executable programs using a single view and sharing an atom on disk. At runtime, an embodiment of the present invention bypasses the conventional mechanism for loading shared libraries (i.e., DLLs), instead using the more efficient atom mechanism which loads at the granularity of atoms 130 instead of, for example, 4K blocks of memory. The atom management program 160 loads atoms 130 from the atom database 120 as needed. The atom management program 160 allocates memory and then manages atoms 130 (e.g., atom 141) within buffers. The atom extractor 150 has previously modified procedure calls to be indirect through atoms 130 for the atom management program 160, which locates existing atoms 130 in memory or loads them from the atom database 120 if they are not already loaded.

The buffer management offers several benefits, including: bounded memory usage, reduced swapping and thrashing and reduced startup times. Bounded memory usage bounds memory usage to any specific size. For example, exactly 8 MB of memory for code atoms 130 could be defined, and older atoms 130 could be swapped out when newer ones are required. Embodiments of the present invention reduce swapping and thrashing by limiting memory usage, therefore the program does not need to use its memory management mechanisms to manage excessive use of memory. The program's memory management is inherently less efficient since it is general purpose and not tuned to specific needs. By loading exactly the code needed, and not necessarily loading other code simply because it is "nearby" in a shared library, memory consumption is reduced. The atom management program 160 reduces startup times. The atom management program 160 will load and execute a first atom 130. As new atoms 130 are needed, they are loaded and executed. Therefore, code is executing right away, without waiting for the entire code set to be loaded into memory. Embodiments of the present invention begin to execute code atoms 130 which are being downloaded before the download has completed (limited by the availability of atoms 130 which may not have been transmitted yet).

Atom management program 160 manages three types of buffers: read-only code buffers (e.g., 176, 178), read-only data buffers (e.g., 186, 188), which can be used for data constants and read-write data buffers (e.g., 196, 198) which can be used for global data. Since the read-write data could be of arbitrary size, and may not be able to be reloaded from the atom database 120, its size may not be limited, thus the program's virtual memory system may be employed for its management.

Loading the atoms 130 into the buffers one at a time is less efficient than loading a working set of atoms 130 simultaneously if it can be determined that they are related. A working set tuner is used to determine which atoms 130 form a "working group". The working set tuner is adapted to collect information for the atomized environment. Once the information is collected, a mechanism is used to take advantage of the information, such as a directive within the atom database 120 which indicates the relationship of atoms 130 to each other. Embodiments of the present invention provide the ability to reorder atoms 130 on disk to match a specific load sequence, thus providing for faster loading.

Through the atom management program's management of the read-only code buffers 176, 178 certain loading optimizations are provided. When one atom 130 makes a procedure call to another atom 130, the call is generally made indirectly, using a stub via the atom management program 160. The procedure call is faster when the in-memory image of the caller's code is modified to make a direct jump ("link snapping") to the target atom 130. However, once the link is snapped, the atom management program 160 can not move or swap out the target atom 130 without invalidating the link. For atoms 130 which are called frequently, this can be a worthwhile tradeoff. Tools are utilized by the atom management program 160 to determine which atoms 130 qualify for direct calling, and for locking atoms 130 into memory. Analysis for link snapping can be done at run-time, by locking down code/data into memory, or at compile-time, by marking certain atom references 136 to not use stubs at run-time. The combination of atom database views 122 and stubs/link snapping provide many options to tune the characteristics of a system to meet desired performance requirements.

A plurality of executable programs 156, 158 can access the same virtual atom database 121 (or new atom database 123) to share code and/or data. For example, executable program 156 calls code atom 141. Executable program 158 also calls code atom 141. A copy of code atom 141 is read from disk and loaded into each program's read-only memory buffer 176, 178. Executable programs 156, 158 can then directly call loaded code atom 141. In this way, multiple different executable programs 156, 158, possibly from different products and/or different product versions, share atoms 130 on disk (e.g., atom 141) that are stored in an atom database 120.

Figure 7B:
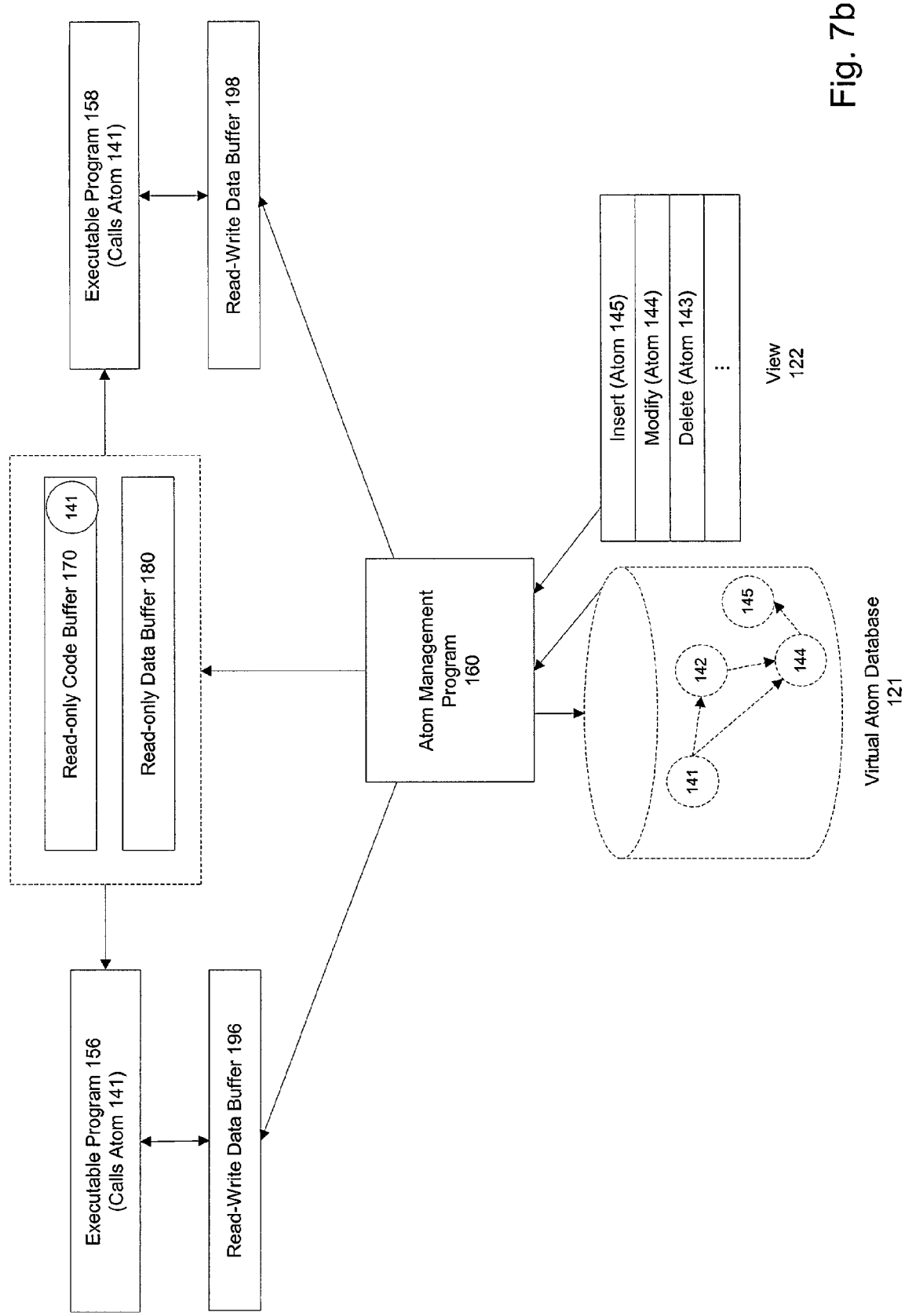
FIG. 7b is a diagram of multiple executable programs using a single view and sharing an atom on disk and in memory.

FIG. 7b is a diagram of multiple executable programs using a single view and sharing an atom on disk and in memory. In this example a plurality of executable programs 156, 158 share buffers (e.g., read-only code buffer 170 and read-only data buffer 180). When a first executable program (e.g., executable program 156) calls atom 141 atom management program 160 loads atom 141 into read-only code buffer 170. When a subsequent executable program (e.g., executable program 158) calls atom 141 atom management program 160 can determine that atom 141 is already loaded. In this way multiple different executable programs 156, 158 share code atoms 130 in memory (e.g., atom 141) that are stored in an atom database 120, providing simultaneous reuse of atoms between a plurality of executing programs. Certain limitations on executable programs sharing read-only code buffer 170 apply, for example, links can not be snapped with shared code atoms. Additional sharing is also possible, as atom 144 can be shared because only one view 122 is being used. Therefore, both executable programs 156, 158 can use the same view 122 and can share the modified copy of atom 144.

Figure 7C:
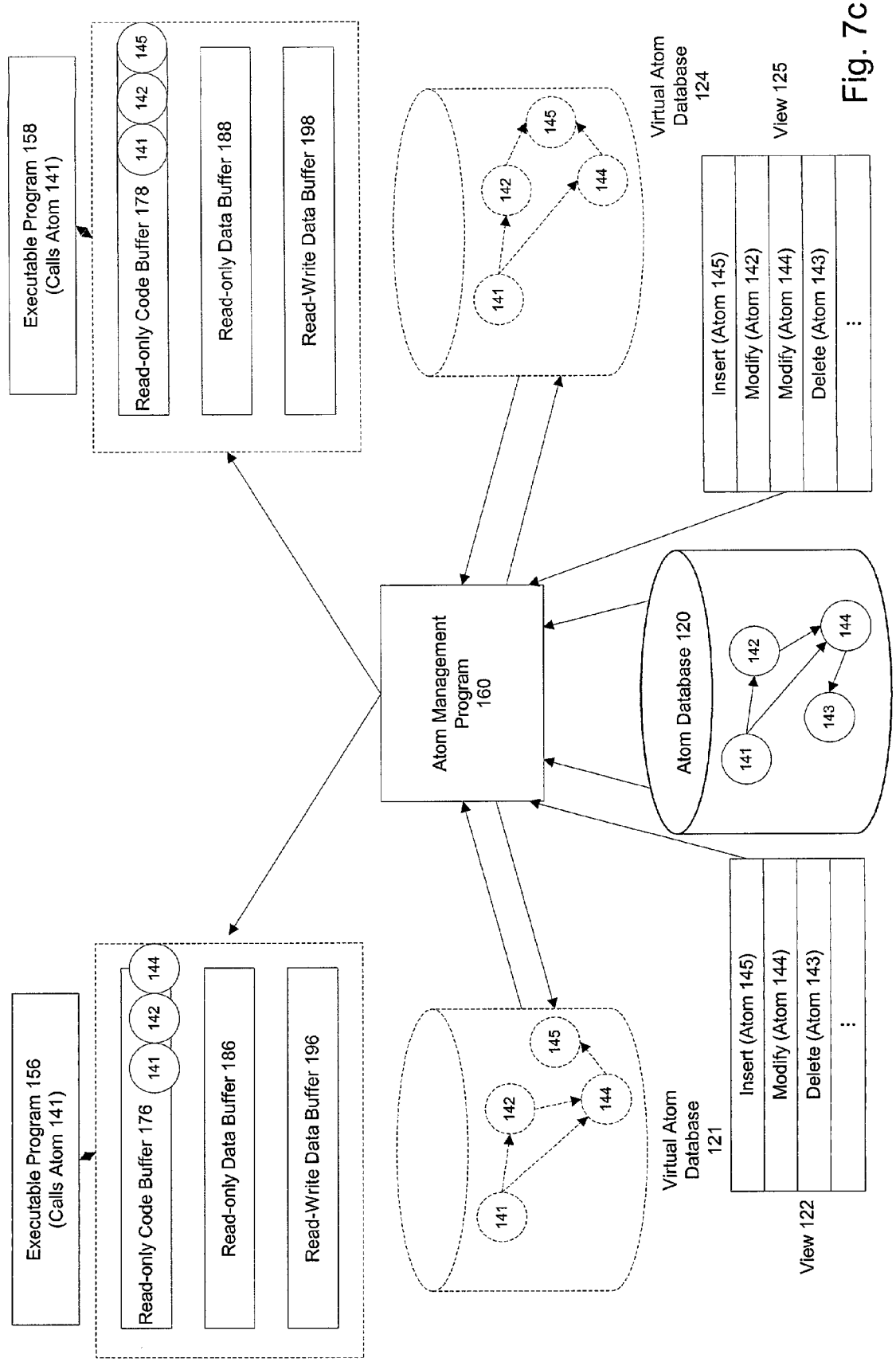
FIG. 7c is a diagram of multiple executable programs using multiple views and sharing an atom on disk.

FIG. 7c is a diagram of multiple executable programs using multiple views and sharing an atom on disk. In this example a plurality of executable programs 156, 158 each have their own buffers (e.g., read-only code buffers 176, 178, read-only data buffers 186, 188 and read-write data buffers 196, 198). In addition, each executable program 156, 158 accesses a different virtual atom database 121, 124 using different views 122, 125 of underlying atom database 120. View 122 creates a virtual database 121 in which code atom 141 calls code atom 142 which calls 144. View 125 creates a virtual database 124 in which code atom 141 calls code atom 142 which calls 145. When executable programs 156, 158 call code atom 141 they access the atom database 120 through their respective views (i.e., view 122, 125) in order to create a virtual atom database (i.e., virtual atom database 121, 124). The executable programs 156, 158 can then share disk copies of atom 141 by loading a copy of atom 141 into their respective buffers (e.g., read-only code buffers 176, 178). When executable program 156's loaded code atom 141 runs it will access code atom 142, which will be loaded into executable program 156's read-only code buffer 176. Code atom 142 is loaded unmodified into the read-only code buffer 176. When executable program 158's loaded code atom 141 runs it will access code atom 142, which will be loaded into executable program 158's readonly code buffer 178. Code atom 142 will be loaded from the atom database 120 having its references transformed as defined in view 125. In this way one hundred percent of code atom 141 is shared and a very large percent of code atom 142 can be shared. For code atom 142 all the code bytes will be shared, most of the references will be shared, as just a single reference was changed. The difference, when code atom 142 is loaded, is due to the fact that each executable program 156, 158 is using a different view 122, 125 to access the atoms 130. In this way multiple different executable programs 156, 158 share some code atoms 130 from disk (e.g., atom 141) that are stored in an atom database 120, while providing for the modification of other atoms 130 as defined by different views 122, 125.

Figure 7D:
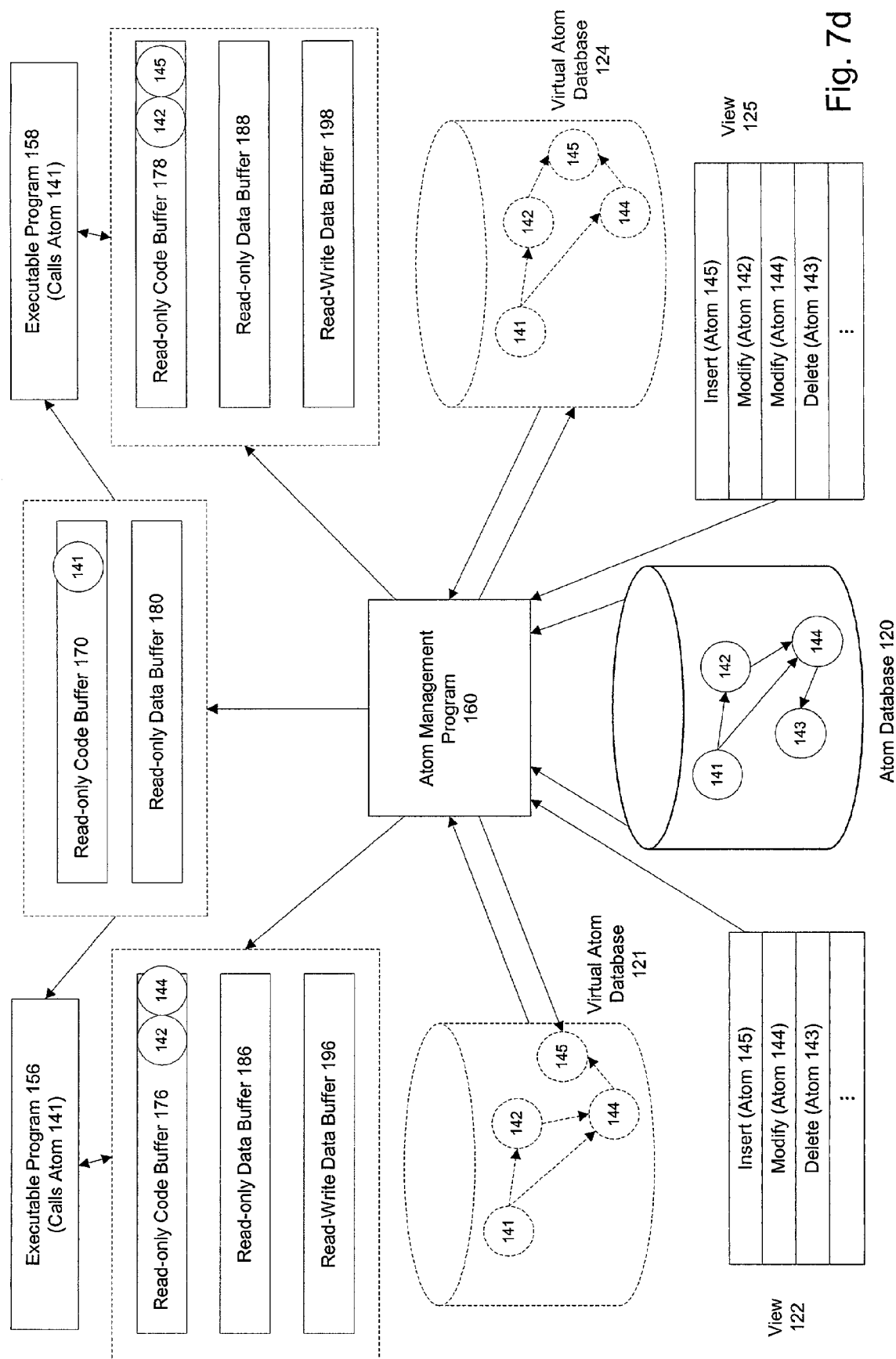
FIG. 7d is a diagram of multiple executable programs using multiple views and sharing an atom on disk and in memory.

FIG. 7d is a diagram of multiple executable programs using multiple views and sharing an atom on disk and in memory. In this example a plurality of executable programs 156, 158 maintain separate buffers (e.g., read-only code buffers 176, 178, read-only data buffers 186, 188 and read-write data buffers 196, 198) as well as share buffers (e.g., read-only code buffer 170 and read-only data buffer 180). In addition, each executable program 156, 158 accesses a different virtual atom database 121, 124 using different views 122, 125. View 122 creates a virtual database 121 in which code atom 141 calls code atom 142 which calls 144. View 125 creates a virtual database 124 in which code atom 141 calls code atom 142 which calls 145. Virtual database 124 may be created by applying view 125 to virtual database 121, in which case a transformation operation would have replaced atom 143 with 145. When executable programs 156, 158 call code atom 141 they access an atom database 120 through a view (e.g., view 122, 125) in order to create a virtual atom database (e.g. virtual atom database 121, 124). Each of the virtual atom databases 121 and 124 may in fact share the same underlying physical atom database 120. The executable programs 156, 158 can then share a disk copy and a memory copy of atom 141 by loading the copy into the shared buffer read-only code buffer 170. When executable program 156 loads code atom 142 it will be loaded into read-only code buffer 176. When executable program 158 loads code atom 142 it will be loaded into read-only code buffer 178. Executable program 156 and executable program 158 can not fully share code atom 142, although they can share the disk, which can be loaded into shared read-only code buffer 170 for use by other callers. The difference in loading is due to the fact that each executable program 156, 158 is using a different view 122, 125 to access the atoms 130 and therefore different transformations are applied. In this way multiple different executable programs 156, 158 share some code atoms 130 from disk and in memory (e.g., atom 141) that are stored in an atom database 120, while providing for the replacement of other atoms 130 as defined by different views 122, 125.

Figure 8:
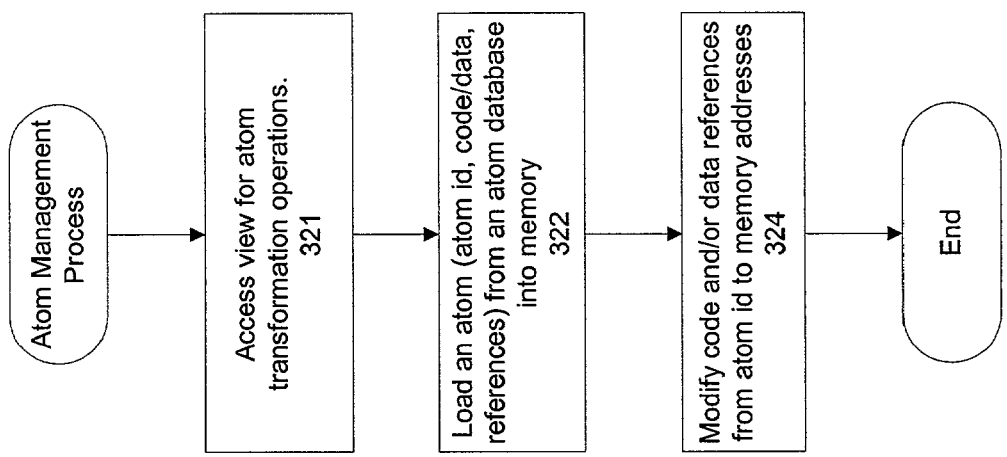
FIG. 8 illustrates an atom management process.

FIG. 8 illustrates an atom management process. At step 321 a view 122 is accessed in order to apply any needed transformations for the atom that is the target of the load. The transformations can include modifications to the atom references, the atom code/data (bytes) and/or atom characteristics. At step 322 an atom management process manages atomized computer program code and/or data by loading into memory, from an atom database, an atom comprising: an atom identifier; computer program code and/or data information; and computer program code and/or data reference information. At step 324 the computer program code and/or data reference information is then modified such that atom identifiers and offsets are replaced by memory addresses.

FIG. 9 is a diagram of an atom database data structure. An atom database 120 stores atoms 130. An atom 130 corresponds to a single datum, such as a compiled procedure or string constant. Atoms 130 are loaded from an atom database 120 into memory when they are needed. This reduces memory footprint and reduces disk I/O. An atom database 120 is a mapping from atom id 132 values (integers) to atoms 130. An atom id 132 can be represented as a 31-bit integer that identifies an atom 130. Atoms 130 can be loaded in any order. The on-disk representation of the atom database 120 is optimized to conserve space and minimize the I/O needed to load atoms 130 into memory. An atom database 120 also provides a mapping from atom id 132 values to information associated with the relevant atom 130, such as symbols and debugging info.

An atom database 120 is one file comprising several distinct sections, each of variable size, the sections include a DB-header 350 and atom maps 360. In various embodiments the atom maps 360 can include: a body-atom-map, a symbol-atom-map, a category-atom-map, and a description-atom-map. The db-header 350 comes first, but the order, location and number of the other map sections is arbitrary. The DB-header 350 contains the file offset for each of the other sections.

DB-header 350 is the very first thing in the database file. It contains some global information about the file and the locations of the other sections, including: magic-number, version-number, cpu-type, os-type, body-atom-map-offset, symbol-atom-map-offset, category-atom-map-offset and description-atom-map-offset.

Magic number identifies this file as an atom database 120 and also defines the endianness of all other multibyte numbers in the file. The magic number consists of these four bytes if the database is stored in little endian byte order: 0xD7 0x15 0xFF 0x31. For a big endian file, the bytes are reversed: 0x31 0xFF 0x15 0xD7. This byte sequence has no particular meaning. The database file will always be stored in the native endianness (byte-order) of the processor whose code it contains. This avoids the need for wasteful byte-swapping at runtime. However, the magic number specifies the endianness unambiguously so that cross-platform tools can manipulate atom databases 120.

Version-number indicates the version of file format used by the database.

CPU type indicates the type of CPU for which the database was produced (e.g., Pentium, PowerPC, etc.).

OS-type is the type of the operating system for which this database was produced (e.g., Win32, Linux, MacOS X, etc.).

Body-atom-map-offset is the file offset where the body-atom-map section begins, relative to the beginning of the file.

Symbol-atom-map-offset is the file offset where the symbol-atom-map section begins, relative to the beginning of the file.

Category-atom-map-offset is the file offset where the category-atom-map section begins, relative to the beginning of the file.

Description-atom-map-offset is the file offset where the description-atom-map section begins, relative to the beginning of the file.

FIG. 10 is a diagram of an atom map header data structure. An atom-map 360 contains an atom-map-header 370 and an atom-map-array 380. The atom-map 360 maps an atom id 132 to a file offset where some information related to that atom id 132 can be found. The atom-map 360 representation will work for any set of atom ids 132, but it is optimized for contiguous ranges of atom ids 132, so for example, an atom-map 360 for atom ids 132 {12, 23, 24, 216} will take more space than one for atom ids 132 {10, 11, 12, 13}. An atom-map 360 section begins with an atom-map-header 370 including a default-atom-sequence-delta 372, an atom-offset-sequence-array-size 374, an atom-offset-sequence-array-offset 376 and an atom-map-data-offset 378.

Default-atom-sequence-delta 372 fields can be used in an atom-map 360 which contains sequences of file offsets for data corresponding to consecutive atom ids 132. These sequences are "delta coded" in the atom-map 360 to save space. Delta coding is the technique of storing a sequence of numbers as the difference between successive pairs. For many sequences, the deltas will be small, and because many encoding schemes can store numbers near zero more compactly, the delta sequence will often take less space than the original sequence. For example, the delta-coded version of: {1000, 1011, 1012, 1013, 1015, 1016} would look like: {1000, 1, 1, 1, 2, 1}. The deltas are usually small positive numbers, but they can be brought even closer to zero by subtracting a well-chosen constant, namely, a default-atom-sequence-delta 372, from each one. For example, suppose the original numeric sequence were {1000, 1050, 1104, 1165, 1202}. Delta coding that sequence yields: {1000, 50, 54, 61, 37}. With default-atom-sequence-delta 372 is equal to 50, this sequence would be further adjusted to: {1000, 0, 4, 11, −13}. Since the final numbers are closer to zero, the sequence can be encoded more compactly. Huffman coding or arithmetic coding schemes can also be applied.

Atom-offset-sequence-array-size 374 is the number of entries in the atom-map's 360 array of sequences.

Atom-offset-sequence-array-offset 376 is the file offset of the atom-map's 360 array of sequences, relative to the start of the atom-map 360 section in the database file.

Atom-map-data-offset 378 is the file offset where the data for the atom-map 360 begins, relative to the start of the atom-map 360 section in the atom database 120 file.

An atom-map 360 (e.g., body-atom-map, symbol-atom-map, category-atom-map and description-atom-map) contains an atom-map-array 380. Each atom-map-array 380 element is a reference to a compressed sequence of file offsets (i.e., an atom-offset-sequence 390). Each atom-offset-sequence 390 contains compressed file offsets for the information belonging to a group of consecutive atom ids 132.

FIG. 11 is a diagram of an atom map array data structure. The atom-map-array 380 consists of the elements: first-id 382, sequence-size 384 and sequence-offset 386. The first-id 382 is the atom id 132 of the first atom 130 in the sequence. The sequence-size 384 is the number of atoms 130 in the atom-offset-sequence 390. The atoms 130 in the sequence have consecutive atom ids 132, starting with first-id 382. The sequence-offset 386 is the file offset to the start of atom-offset-sequence 390, relative to the start of the atom-map 360 section of the atom database 120 file. The atom-map-array 380 is sorted by the atom id 132 of the first atom 130 in each sequence. This makes it possible to map an atom id 132 to its containing sequence by doing a binary search. Scanning the containing sequence will then yield the file offset for the desired atom 130.

FIG. 12 is a diagram of an atom offset sequence data structure. The atom-offset-sequence 390 is a delta coded array of file offsets including: a first-atom-file-offset 392 and an array of delta-coded-file-offsets 394. Each file offset is added to the atom-map-data-offset 378, and the result is interpreted relative to the start of the atom-map 360 section. One long sequence takes less space than two smaller sequences containing the same number of file offsets, because it amortizes the fixed overhead per sequence. However, the longer sequence takes longer to search. So atom-maps 360 are typically broken into more sequences than strictly necessary, to put a reasonable bound on their length and hence on the search times. There is, however, no fixed limit to the sequence size.

First-atom-file-offset 392 is the file offset of the first atom 130 in the sequence. The rest of the sequence is a series of deltas, starting with this value.

Delta-coded-file-offset-array 394 is a block of bytes encoding a sequence of file offsets where the data belonging to consecutive atom ids 132 can be found.

To encode a sequence the encoder begins with a sequence of file offsets. These represent byte offsets to be added to the atom-map-data-offset 378. For example, suppose the original file offset sequence were {1000, 1050, 1104, 1165, 1645, 760}. Note that the atoms 130 are not necessarily in order in the file. First, the sequence is delta coded yielding {1000, 50, 54, 61, 480, −885}. If default-atom-sequence-delta 372 is equal to 50, this sequence would be further adjusted to {1000, 0, 4, 11, 430, −935}. Finally, each number in the sequence (after the first, which is stored in first-atom-file-offset 392), is encoded as a variable size integer. The encoding yields the byte sequence {0x00 0x04 0x0B 0x83 0x2E 0xF8 0x59}. Some integers are stored using a variable-size encoding scheme that takes fewer bytes for smaller values. Signed integers are encoded as a sequence of 7-bit values. The values are stored in big-endian byte order (most significant byte first), regardless of the overall endianness of the database. The high bit of each byte is a special flag that indicates whether any further bytes follow. The seventh bit of the first byte (the most significant bit of numeric data) is sign-extended. Unsigned integers are encoded as a sequence of 7-bit values. The values are stored in big-endian byte order (most significant byte first), regardless of the overall endianness of the database. The high bit of each byte is a special flag that indicates whether any further bytes follow. The resulting value is zero-extended.

Atom maps 360 are used to associate information of a specific type with an atom id 132. For example, atom maps 360 can be used for code/data body information, symbol information, category information and description information.

Body-atom-maps map each atom id 132 to a block of information needed to load that atom id 132, including, for normal atoms, compressed information about the atom references 136 and atom bytes 134 which can be combined to form the final normal atom body, and for special-purpose atoms, information appropriate to each sub-type of the special-purpose atom.

The first byte of the block is used to encode a set of atom-flags 396. If the value of the low three bits of the atom-flag 396 does not contain a special-purpose identifier (e.g., three on-bits indicating the value "7"), then the atom 130 is a normal atom, otherwise, it is a special-purpose atom. To speed the loading of normal atom bodies, both the atom references 136 and atom bytes 134 for an atom 130 are stored contiguously in the atom database 120 file. To keep the size of the atom database 120 small, and thus to improve the speed at which it can be loaded, the atom references 136 and atom bytes 134 for a normal atom body are compressed in a variety of ways.

FIG. 13 is a diagram of an encoded atom data structure. The block of information for a normal-atom consists of: atom-flags 396, atom-num-info 397, encoded-atom-references 398, and encoded-raw-atom-bytes 399.

Atom-flags 396 use various bits of the flags byte specify the atom compression type. Embodiments of the present invention support multiple compression types. Other bits of the atom-flags 396 byte specify into which buffer the atom should be loaded (i.e., read-only code buffer, read-only data buffer, read-write data buffer). Still other bits define the log base two of the alignment that the atom 130 requires when loaded (e.g., a value of "3" stored in these bits would cause the atom 130 to be aligned mod 8 bytes when loaded).

Atom-num-info 397 is a block of bytes containing information about how many references will appear in the encoded-atom-references 398 block, and how many raw bytes will be extracted from the encoded-raw-atom-bytes 399 block. That entry will determine both the number of references and the number of raw bytes to extract. Conceptual atom bytes 134 and atom references 136 are encoded as encoded-atom-references 398 and encoded-atom-raw-bytes 399, respectively.

FIG. 14 is a diagram of an encoded atom reference data structure. Each encoded-atom-references 398 is a block of bytes describing references from this atom 130 to other atoms 130. For example, if the atom 130 represents a procedure that calls another procedure, represented by another atom 130, the latter atom 130 would be described in the encoded-atom-references 398. This array of encoded-atom-references 398 is used by the atom management program 160 to link together atoms 130 as it loads them.

Atom-num-info 397 is the number of atom references encoded by the encodedatom-references 398.

Each encoded-atom-reference 398 contains: an atom-ref-type 402, a source-offset-delta 404, a dest-offset 406 and a dest-atom-id 408.

Atom-ref-type 402 defines different types of references from an atom 130 to other atoms 130. Not all types will be used by all platforms. Valid atom-ref-types 402 include eager-absolute-32, eager-relative-32, lazy-absolute-code-32, lazy-relative-code-32, and lazy-absolute-32.

Eager-absolute-32 causes the atom management program 160 to load the referenced atom 130 immediately and store an absolute address to it.

Eager-relative-32 is similar to eager-absolute-32, but eager-relative-32 stores a relative offset to the referenced atom 130. Relative offsets are measured from the beginning of the reference.

Lazy-absolute-code-32 defines an absolute address (e.g., 32-bit) to an atom 130 containing code. It is "lazy" in that the referenced atom 130 is not actually loaded until it is first called. The atom management program 160 manages the delayed loading by setting up the reference to point to a code stub that lazily loads the referenced atom 130 the first time it is called.

Lazy-relative-code-32 is similar to lazy-absolute-code-32, but lazy-relative-code-32 stores a relative offset to the reference. Relative offsets are measured from the beginning of the reference.

Lazy, or load on demand, loading of data is provided implicitly by providing lazy loading of code and explicitly by encoding a referencing atom identifier such that the referenced data atom is not loaded until actually accessed at runtime. Since the loading of code that references data can be delayed until invoked, the data that the code references is likewise delayed—implicitly providing lazy loading of the data. Explicitly lazy data typically requires programmer support in order to mark the data to be lazily loaded (e.g., using compiler directives). In one embodiment, explicitly lazy data is referenced using a specific encoding algorithm that multiplies the referencing atom identifier by two and the increments the referencing atom identifier by one to produce a lazy data atom identifier.

Lazy-absolute-32 defines an absolute (e.g., 32-bit) address to another atom 130. It is "lazy" in that the referenced atom 130 is not actually explicitly loaded. Rather, the atom management program 160 links this reference by storing an encoded address (2* referenced atom id)+1. Note that this encoded address is always odd. Unlike lazy code references, which can use jump stubs, lazy data references require cooperation from the program the atom management program 160 is running. It has to check for odd pointer values and recognize that they are lazy data references. It then needs to load the desired atom 130 by calling back into the atom management program 160, and would typically overwrite the reference with a final address. Naturally lazily loaded data must be known to have even alignment, or an odd value for such a pointer will be ambiguous.

Source-offset-delta 404 specifies how many bytes into the atom 130 that a reference appears. This value is expressed as a delta from the end of the previous reference. The very first reference is encoded as if there were a previous reference ending at source-offset 0. References are always stored sorted by their source-offset, so the deltas in this array are always nonnegative. For example, if an atom 130 had four-byte references at byte offsets 0, 4, 8, 12, 20, the source-offset-delta fields for those references would be encoded as 0, 0, 0, 0, 4.

Dest-offset 406 encodes the offset of the number of bytes into the referenced (dest) atom 130 the reference points.

Dest-atom-id 408 is the atom id 132 for the atom 130 to which this reference points.

Encoded-raw-atom-bytes 399 is a block of bytes that represents atom bytes 134 for atom 130, with the space required to hold any references to other atoms 130 "spliced out", and with the remaining raw bytes compressed in a manner specified by the atom compression type. References within the atom bytes can be removed to create the raw bytes because encoded reference information contains a source offset (identifying where the reference is made), a destination id (identifying the target atom) and a destination offset (identifying how many bytes into the target atom the reference points). For example, if the atom bytes 134 represent a C string constant, this array would hold the sequence of characters in the string, possibly compressed. If instead the atom bytes 134 consist of four data bytes, followed by a four-byte reference to another atom 130, followed by eight more data bytes, the encoded-raw-atom-bytes 399 would contain just the twelve bytes of data, possibly compressed. The four byte reference will be "spliced in" to place during loading, making the fully-loaded atom bytes 134 take up 16 bytes.

Special-purpose atoms are defined by an atom-flag 396 containing a special-purpose identifier (e.g., its lower three bits set to the value "7"). The remaining bits of atom-flags 396 specify whether the special-purpose atom is a dll-ref-atom or a dll-atom.

Dll-ref-atoms comprise three fields: atom-flags, dll-atom-id and dll-symbol. Dll-ref-atoms correspond to symbols in external DLLs (such as an atom 130 for a library function such as printf( )). Those atoms 130 are represented as a pair of a DLL and a symbol to look up in that DLL. Dll-atom-id specifies the id of the dll-atom which specifies the DLL in which to look up the dll-symbol. Dll-symbol specifies which symbol to look up in the DLL.

Dll-atoms comprise an atom-flags field and a dll-path-name field. Dll-atoms are related to dll-ref-atoms and are used to specify the DLL in which a dll-ref-atom will be looking up a symbol. Dll-patb-name specifies a pathname suitable for passing to dlopen, LoadLibrary, or equivalent function. It is stored as a C string (a sequence of bytes ending in 0).

Symbol-atom-map maps an atom id 132 to a textual symbol, by which the associated atom 130 can be accessed by name. Symbols are useful for referencing atoms 130 in a user-friendly manner. For example, when referring to an atom 130 with and atom identifier value of 57, it is easier for a programmer to reference the atom 130 by name (e.g., "printf"), than by its atom identifier value (e.g., "57").

Category-atom-map is an atom-map 360 from an atom id 132 to a textual category with no fixed semantics. Category-atom-maps allow for developer specific categorization of atoms. In other examples, categories can be used for tagging atoms 130 to identify character string atoms 130, identify atoms 130 for internationalization and for many other purposes.

Description-atom-map is an atom-map 360 from an atom id 132 to a textual description with no fixed semantics. Description-atom-maps can be used for storing debug information useful to developers when developing/debugging an atom-based system.

The reference type of an atom reference can be changed statically or dynamically, based upon profiling the usage of the reference. An atom reference 136 generally defaults to "lazy" in order to delay the loading of the actual atom bytes 134 until it is actually needed at runtime. "Eager" references cause the referenced data/code to be loaded when the calling atom 130 is loaded, regardless of whether or not it will actually be needed. Often the runtime code path executed within a given atom 130 at runtime will not execute all instructions within the atom 130. Loading uncalled or unreferenced atoms 130 can be wasteful of memory and processing resources.

Resolving lazy references for code includes pointing to a code stub that lazily loads the referenced atom 130 the first time it is called. Resolving lazy references for data includes storing the referenced atom id as a modified atom id defined as (2* referenced atom id)+1.

Once a lazy code reference is executed/accessed, an optimization can be done to avoid the indirection of using the code stub. The optimization includes "back-patching" the referencing code to directly reference the loaded atom 130. Back-patching replaces the use of the stub with a direct jump to the code atom 130 in memory. The back-patching can be done for the first actual caller and can also be applied to any loaded atoms 130 such that if and when the referenced atom 130 is actually called a direct jump can be made to it. The code stub can be left in memory for use by any atom for which back-patching was not done. Embodiments of the present invention provide for code atom 130 and data atom 130 references to be tagged to effect a particular loading action (e.g., lazy or eager) at the atom level.

Figure 15:
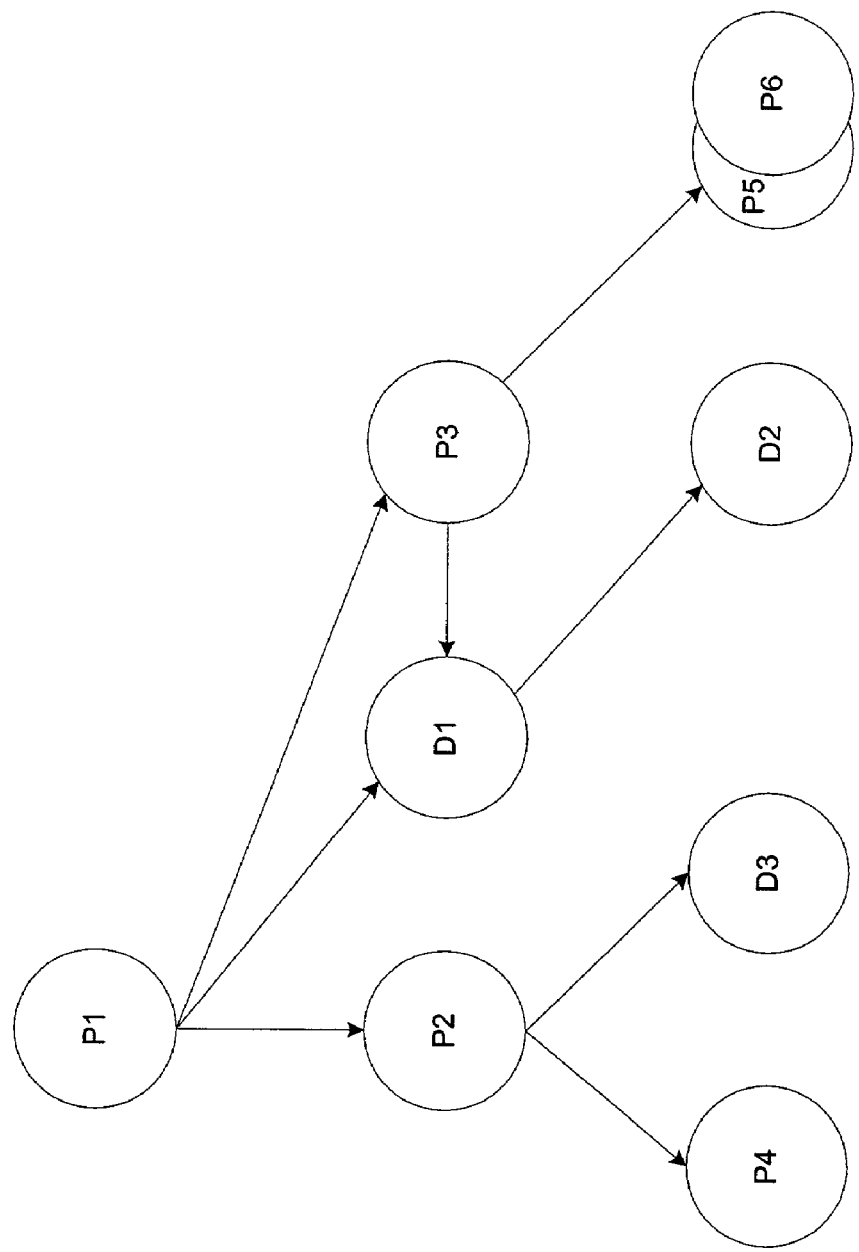
FIG. 15 is a diagram of an example system of six code procedures and three data elements.

FIG. 15 is a diagram of an example system of six code procedures and three data elements. In this example procedure P1 calls procedures P2 and P3, procedure P1 also accesses data element D1, which accesses data element D2. Procedure P2 calls procedure P4 and accesses data element D3. Procedure P3 accesses data element D1 and calls procedure P5. According to an embodiment of the present invention each code procedure {P1, P2, P3, P4, P5, P6} is defined as a single individually addressable atom. Similarly, each data element {D1, D2, D3} is defined as a single individually addressable atom. At runtime, when P1 is loaded, D1 is loaded immediately, which causes D2 to be loaded. If the references to P2 and P3 are lazy, stubs will be created for P2 and P3, allowing for the actual loading of the code of the procedures to be deferred until a time if, and when, they are actually called. It is very possible that some code procedures (e.g., error handlers) will not be called during a normal execution path. In this case, processing and memory will be saved by delaying the loading. Implicit lazy loading of data (e.g., D3) based on lazy loading of code (e.g., P2) provides both processor and memory savings.

Data atom references can be encoded to provide a similar capability for data elements. Explicitly lazy loading of data can provide even more savings (e.g., loading of D3 can be delayed even after P2 is loaded).

By modifying the atom identifier of a referenced atom an atom management program 160 can delay the loading of a data element/atom until it is actually referenced. As with code atoms, it is very possible that some data atoms (e.g., error messages) will not be referenced during a normal execution path. Lazy/delayed loading of data atoms also saves processing and memory.

Conventional systems (e.g., Linux DLLs) provide code stubs, but these systems build stubs for all possible references at startup time. In contrast, embodiments of the present invention only build stubs for each atom 130 actually referenced by a loaded atom 130. Referring to FIG. 13, loading P1 will cause stubs for P2 and P3 to be created, but not for P4. Conventional systems typically load all data elements at startup. For example, in a conventional system, D1, D2 and D3 would all be loaded at startup. In contrast, embodiments of the present invention only load D3 when D2 is loaded, or only when D3 is actually used. The flexibility to treat data and code in a similar fashion with regard to loading provides many performance improvements. This is especially true of systems that have a relatively large ratio of data to code.

Using views, the example system can include a new procedure, P6, which is a replacement for P5. The existing system does not have to change as a view can be applied for loading and referencing operations that replace references to P5 with references to P6.

FIG. 16a is a diagram of example data atoms 130. The data atoms 130 are represented conceptually to exemplify their atom id 132, atom bytes 134 and atom references 136. Data atom 16001 (analogous to D1 in FIG. 15) contains two items of data (atom bytes 134): a reference (pointer) to a person's name (i.e., "Mary Smith") and an integer representing Mary's age (i.e., 47). The reference (atom reference 136) is a reference to atom 16002. Atom 16002 (analogous to D2 in FIG. 15) is a data atom 130 representing the character string "Mary Smith" (atom bytes 132), atom 16002 does not reference any other atoms.

FIG. 16b is a diagram of example code atoms 130. The code atoms 130 are represented conceptually to exemplify their atom id 132, atom bytes 134 and atom references 136. Code atom 15000 (analogous to P5 in FIG. 15) represents executable code for a print_person( ) procedure, which prints a person's and age. Code atom 16000 (analogous to P3 in FIG. 15) represents a procedure which calls the print_person( ) procedure to print Mary's name and age. Code atom 16000 references the data for Mary by referencing the data atom 16001, and invokes the print_person( ) function through a reference to code atom 15000, print_person( ). Therefore, the atom represented by atom 16000 contains two atom references 136, a code atom reference 136 to atom 15000 (the code atom for the print_person( ) procedure) and a data atom reference 136 to atom 16001 (the data atom for Mary's data).

Figure 16C:
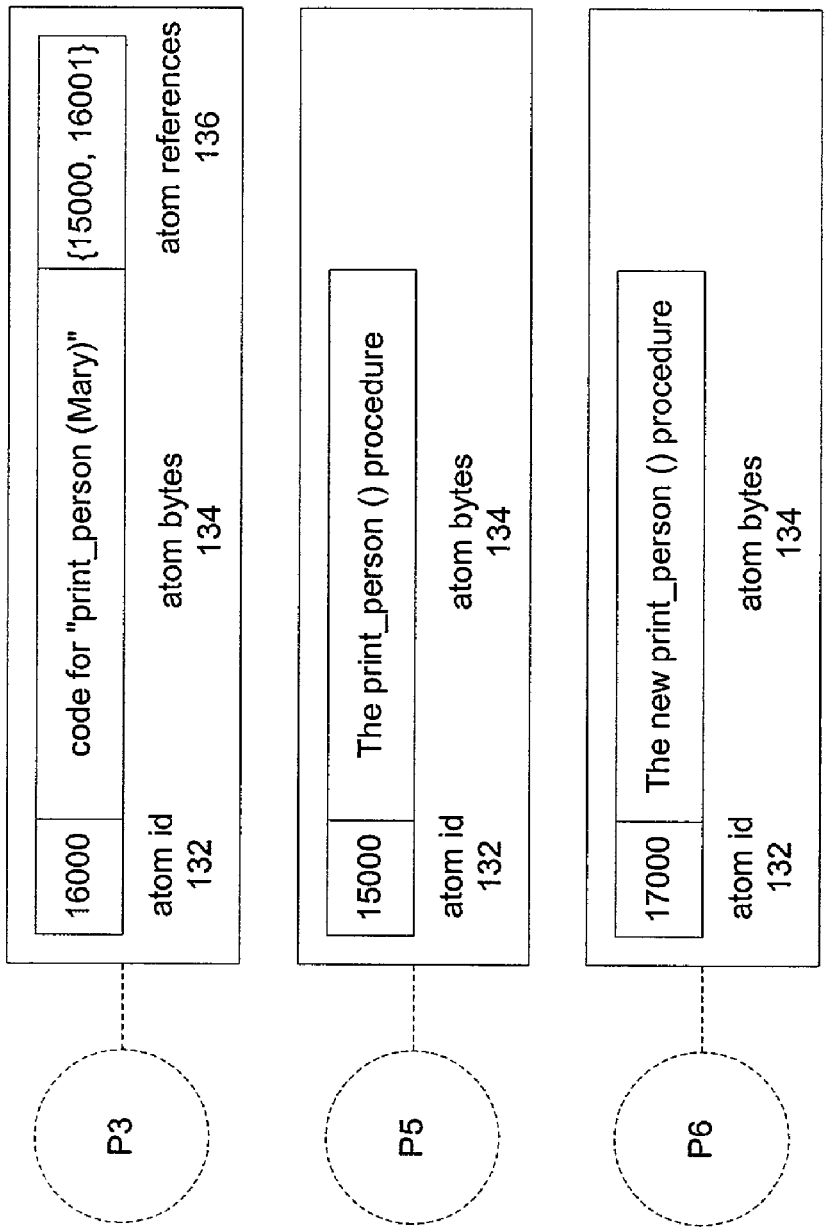
FIG. 16c is a diagram of example replaced code atoms.

FIG. 16c is a diagram of example replaced code atoms. Code atom 17000 is added to the atom database 120 and represents an updated version of the print_person( ) procedure (atom 15000). Executable programs that call print_person( ) can now either call the old print_person( ) procedure (atom id 15000), or the new print_person( ) procedure (atom 17000), depending upon whether the executable programs are executed with a view that modifies references to atom 15000 with reference to code atom 17000 or not. In this way, a view can be applied to enable an executable program to call an updated version of an existing procedure while still leaving the existing procedure in place for alternate callers.

FIG. 17a is a diagram of an atom database difference process. An atom database difference process 500 takes two atom databases, first atom database 510 and second atom database 520 and produces a view 122 that can be stored as a patch file. The view 122 can be used to virtually, or physically, transform one atom database to another. One goal of the atom database difference process 500 is to minimize the size of the view 122 such that it can be stored and distributed in an efficient manner.

Each atom 130 has a "body" (atom body 134) consisting of a block of bytes (such as the executable code for a procedure, or the characters of a string constant), plus zero or more references (atom references 136) to other atoms 130. Each reference is located at some specific offset within the body; for example, a call instruction 20 bytes into the procedure would typically contain a reference to the atom 130 for the called procedure at or near offset 20.

An atom database 120 encodes a directed graph with labeled edges, where each atom 130 is a node and each atom reference 136 is an edge. Producing a patch file involves identifying subgraphs which are common between the first atom database 510 and the second atom database 520, and reusing them rather than shipping those nodes again in the patch file. Unfortunately, producing a quality patch requires more than just identifying isomorphic subgraphs. In practice, subgraphs are often isomorphic except for one or two differences; this happens, for example, when one procedure is changed but all the procedures that call it remain unchanged. We would still like to reuse the bulk of the atoms for the subgraph, rather than giving up on them altogether because of one difference.

The patch file encodes a sequence of transformations to the first atom database 510 that render its resulting graph isomorphic to the second atom database 520. Identifying the right set of transformations is part of the atom database difference process 500. The atom database difference process 500 classifies each atom in the second atom database 520 into one of three categories, each of which is a different kind of graph transformation. This vector of classifications contains all the information necessary to produce a patch file. The reuse classification determines that an atom 130 in first atom database 510 can be reused, so there is no need to add it to the differense set. This is the best case. The replace classification determines that a new atom 130 needs to replace an atom 130 in first atom database 510, presumably to allow other atoms 130 to fall into the reuse category. The bytes for this atom 130 will appear in patch file. The insert classification determines that this new atom 130 has nothing in common with any atoms 130 in first atom database 510, so it needs to be added. The bytes for this atom 130 will appear in the patch file. Insert is considered slightly better than replace, because the patch file does not need to contain information describing the replacement. A delete operation is optional because extra atoms 130 can be left lying around after a patch is performed without detriment. The process doesn't have to actually replace atoms 130 on disk when applying a patch, because transformation operations can be used to modify references to the old atom 130, when viewed from the perspective of a post-patched installation, should use the new atom 130 instead.

Referring now to FIG. 17b, here each capital letter {A, B, C, D, E, F} indicates the contents of an atom 130. Two atoms have equal bodies if and only if they have the same capital letter. The prime suffix "'" indicates that a node is in the new graph. The optimal sequence of transformations for this graph is: reuse(C, C'), replace(D, E'), reuse(B, B') and insert(A'). A delete(F) transformation is optional.

An important thing to notice is that the transformation replace(D, E') was critical to enabling the transformation reuse(B, B'). Once the atoms referenced by B and B' were transformed to be equal, B and B' became equal. The algorithm spends a lot of its time trying to transform the graph to enable as many reuse merges as possible. The transformations allowed B and C to be reused from the old graph, so they don't have to be shipped in the patch file.

Now referring to FIG. 17c, an example is presented that looks simpler but is actually more complicated. Note that edges are ordered, so the two graphs are not trivially isomorphic. In this example a choice must be made; either reuse X and Y, or reuse A. Both will work. In order to Reuse X and Y: reuse(X, X'), reuse(Y, Y') and replace(A, A'). In order to reuse A: replace(X, Y'), replace(Y, X') and reuse(A, A'). The right answer depends on how big X, Y, and A are. If A is small compared to X and Y, the first answer is better. If A is comparatively large, then the second answer is better.

A greedy algorithm is used to choose a set of graph transformations that maximize reuse merges. The algorithm is not guaranteed to produce an optimal result, will do well when the graphs are reasonably similar. Two atoms 130, one from (old) first atom database 510 and one from (new) second atom database 520 are defined as "merged" when the difference algorithm maps one to the other. After two atoms 130 are merged, they are henceforth treated as equal. The noun "merge" describes a pair of atoms 130 which are under consideration for being merged. A "committed merge" is a merge which was actually performed. Once the difference algorithm is complete, each committed merge will be classified as either a reuse merge or replace merge. Atoms 130 which remain unmerged are classified as insert merges. Each atom 130 can be merged at most once. Two atoms (old-atom, new-atom) are "compatible" if they might yet end up merged together with a reuse merge. Specifically:

1) the atoms 130 have not merged with any atom 130 besides each other,
2) the atoms 130 have identical atom bodies,
3) the atoms 130 have pairwise identical references, ignoring the atoms 130 they reference, in other words, the references have the same offsets, types, etc,
4) all referenced atoms 130 have either merged with each other pairwise, or have not merged at all, in other words, a merge that makes it impossible for this merge to be a reused hasn't been committed to,
5) references to "self" must line up pairwise in the two atoms, and
6) the atoms 130 have no internally contradictory merge requirements, this could happen, for example, if old-atom referenced atom X twice and new-atom referenced atoms A and B. In order to be a reuse merge, X would have to be merged with both A and B, which is impossible.

Two atoms 130 (old-atom, new-atom) are "uniquely compatible" if they are "compatible" with each other and with no other atoms 130. The "weight" of a merge is an indication of its importance. The weight is equal to the estimated number of bytes that will be added to the patch file if the atoms 130 are not successfully merged with a reuse merge. This is essentially the size of the atom's disk representation in bytes.

The outline for a difference algorithm includes the following steps:

1) canonicalize old-db and new-db,
2) identify a set GM of "goal" merges,
3) identify a set AM of merges that assist GM,
4) while GM is not empty:
   a) select and apply best merge in AM.
   b) update GM.
   c) update AM.
5) undo each committed merge that turned out neither to be a reuse merge nor to assist with a committed reuse merge, if any uniquely compatible merges appear, add all of them to GM, give one infinite weight and go to step 3).
6) apply modified sharing algorithm between old-db and new-db to look for remaining isomorphisms, if any uniquely compatible merges appear, add all of them to GM, give one infinite weight and go to step 3).
7) if any compatible merges exist, commit the one with the largest weight, give it infinite weight, add it to GM, and go to step 3).

Canonicalizing an old-db and a new-db includes running a standard atom sharing algorithm over old-db and new-db, independently of each other to collapse isomorphic subgraphs within each database. This canonicalizes the databases, obviating most cases where atoms need to be merged multiple times.

Identifying GM, the set of "goal merges" comprises trying to line up the two graphs by nailing down some "fixed points" in an otherwise ambiguous sea of atoms. These provide a starting point from which other merging decisions can be made. At all times GM is equal to the set of all uniquely compatible merges that have not yet become official reuse merges. Find uniquely compatible merges with a hash table that hashes the bodies of atoms as well as the structure of their references. As the algorithm proceeds, merges will be added to and removed from GM as the rest of the graph is transformed. Elements of GM are called "goal merges". Note that the algorithm does not try to find all reuses that could ever happen. There will often be an extremely large number of them. In the worst case, the total number of possible reuse merges will be on the order of the square of the graph size.

Identifying AM, the set of "assist merges" proceeds knowing that for a goal merge to become a reuse, all referenced atoms must be merged pairwise. Those pairwise merges are called "assist merges", and the set of all of them is AM. AM is therefore purely a function of GM. Elements of GM may also appear in AM. This happens when a goal merge assists another goal merge.

When applying "obvious" merges, a drawback to merging one atom with another is that those atoms are no longer free to merge with any other atoms. However, if only one other atom is a potential merge partner (and vice versa), then that drawback evaporates. In such cases, there is no harm in merging those two atoms right away. The advantage of committing such merges is that they help make the scores of the remaining merge candidates more accurate. During this phase, all such "obvious" merges are identified and applied. Each atom can end up in goal merges, assist merges, or both. Since it is important to decide whether there is more than one potential merge, it isn't necessary to instantiate all possible merges (which might take n-squared time). Instead merges can be counted and the process can stop when the second possible merge partner is found. The number of potential goal merges is, by definition, the same as the number of compatible atoms. This is easily computed using a hash table.

Counting potential assist merges for atom X is more difficult. This is done by iterating through all parents of X. For each parent, examine the other atoms with which that parent is compatible; each of those represents a potential goal merge. For each potential goal merge, note the analogous atom with which X would have to merge to make it a successful reuse merge. Each such atom is a potential assist merge partner for X. Counting those atoms reveals how many assist merge candidates that X could ever be a part of.

While GM is not empty, attempt to turn each goal merge (old-atom, new-atom) into an actual reuse. As discussed earlier, this requires the pairwise merging of all the atoms referenced by old-atom and new-atom. The main loop identifies the merge with the highest "score" (defined below) and greedily commits that merge, repeating the process until GM is empty. Merges with negative scores can theoretically be committed if they have the highest score (it would be difficult if not impossible to construct a case where this can actually happen), but merges whose score equals minus infinity are explicitly ignored.

Each merge has a "score" that (very roughly) estimates how much committing that merge will reduce the size of the patch file. Both assist merges and goal merges have scores. It's important that score computation be a relatively local process. If each merge requires changing the scores of the entire graph, the algorithm will run too slowly to be practical. If a merge is not an assist merge and is not a goal merge with all of its assist merges having been committed, its score is minus infinity. Otherwise, its score is a function of the "pressure" placed upon it by goal merges.

Each goal merge applies pressure evenly to all the uncommitted assist merges on which it depends, as well as to itself. References to "self" receive no pressure. The pressure is computed by taking the goal merge's weight divided by the number of uncommitted assist merges, excluding references to "self".

So a very large atom with a small number of references will place a great deal of pressure on its assist merges, and an atom with a large number of references will place relatively little pressure on its assist merges, indicating that the benefit per merge is small. Because of this formula, as more assist merges get committed, the pressure on the remaining candidates to merge goes up, encouraging them to "finish the job".

The sum of all pressures on a merge is called P. The score of assist merge M is equal to its P value minus the max of all P values for other assist merges that are mutually exclusive with M. For example, merging atoms (X, Y) means atoms (X, Z) cannot be merged, because X can only be merged once. If there is much to be gained by merging (X, Z), then it makes sense for the (X, Y) merge to be penalized for preventing it.

A "max" is used instead of "sum" to avoid pathological penalization when a large number of merges are possible, because they can't all happen. In the previous example, each merge prevented by (X, Y) must involve either X or Y, so even if thousands of merges are theoretically prevented (e.g. (X, A), (X, B), (X, C), . . . ), at most two of those merges could happen simultaneously (one merge involving X and one involving Y). So penalizing for thousands of prevented merges would be excessively harsh.

Note that goal merges apply pressure to themselves, even though their scores are usually minus infinity. This is so that assist merges which are mutually exclusive with a goal merge are penalized for preventing it.

Merging two atoms can cause three things to change: GM, AM or the scores of merges in AM and GM. Obviously the set of goal merges changes if a goal merge becomes a committed reuse. When this happens, the merge is removed from GM, since it is completely done. Simply committing a goal merge is not enough to remove it from GM, because it may still need to apply pressure to its assist merges so it actually becomes a reuse. When a merge is committed, other merges involving those atoms become impossible, since each atom can only merge once. That will cause any goal merges that were depending on the now-impossible merges to lose all hope of becoming reuse merges, and therefore they stop being goal merges and are removed from GM. Merges may also create new goal merges by turning compatible merges into uniquely compatible merges. For example, suppose there are ten atoms in each of old-db and new-db, all compatible with each other. There is no perfect guide for which pairs represent good merges, so the process doesn't generate all 100 (10*10) goal merges. But when merges occur in atoms referenced by these atoms, suddenly pairs of these atoms may become uniquely compatible, because for a given atom in old-db, there may be only one atom in new-db that both has the same body and whose merged reference(s) all still potentially line up.

Merging two compatible atoms together that were not previously considered a goal merge creates a new goal merge, because now they are uniquely compatible. One way to look at it is, since having committed to merging them, the process might as well try to make the merge into a reuse by placing pressure on the atoms they reference.

AM is purely a function of GM, so changes to GM affect AM. Semantically, it is as if AM were recomputed from scratch each time GM changes. In practice, AM is updated incrementally.

The scores of merges are affected by merges according to the formulas given above. Semantically, it is as if all merge candidate scores were recomputed from scratch. In practice, only the scores of atoms "near" the merge in the atom graph need to have their scores updated.

If a committed merge was neither a reuse nor enabled a reuse, it should be undone. This is for two reasons: first, replace merges are slightly more expensive than inserts. Second, undoing a merge makes the atoms involved eligible for different merges, which may be necessary to make some reuse merge possible. If any uncommitted uniquely compatible merges appear after the undo step, add all of them to GM and retry the main loop. But before starting to loop again, give the new goal merge with the highest weight infinite weight to guarantee that at least that merge will become a committed reuse. This guarantees the algorithm will eventually terminate, rather than perpetually undoing and re-applying merges forever.

The atom system already has a general purpose sharing algorithm that can collapse all isomorphic atoms in a database. The problem is essentially the same as that of "FSM reduction". The problem of computing a diff between two graphs is related to sharing isomorphic atoms, because both algorithms are looking for isomorphisms. Running a modified sharing algorithm between old-db and new-db is a good backstop for locating isomorphisms missed by the other passes. This modified sharing algorithm differs from the standard sharing algorithm in a few ways: 1) atoms may only share between databases, not within them, 2) even atoms that are normally not shareable, such as mutable data, may be shared and 3) each atom may only be shared once. If any uncommitted uniquely compatible merges appear after the sharing step, retry the main loop after giving the weightiest goal merge infinite weight, just as in the previous step.

If any compatible merges still exist, commit the one with the largest weight, give it infinite weight, add it to GM, and retry the main loop. In the alternative, the option exists of examining the human readable description associated with each atom and using that to guide merging. This "cheating" will often work well but will fail if a procedure was renamed but otherwise remains unchanged.

While this invention has been particularly shown and described with references to preferred embodiments thereof, it will be understood by those skilled in the art that various changes in form and details may be made therein without departing from the scope of the invention encompassed by the appended claims.

Specifically, an atom database 120 is described having a number of distinct sections, those skilled in the art will readily recognize that sections representing various uses of atoms 130 can be added or removed within the teachings of the present invention. Additionally, actual disk encoding schemes can vary within the teachings of the present invention.

Although embodiments of the present invention are appropriate for implementing a Curl™ runtime, nothing in the disclosure limits the use of the present invention to the Curl™ runtime. Embodiments of the present invention can be applied to any software program.

What is claimed is:

1. A method of creating a view of a first atom database, comprising:
    associating the view and the first atom database with a first executable program and a second executable program;
    defining a set of transformation operations;
    applying the set of transform operations to the first atom database, wherein the first atom database stores atoms;
    determining whether the transform operations are applied virtually or literally;
    if the transformation operations are applied literally, creating a new atom database, wherein the new atom database stores atoms;
    if the transformation operations are applied virtually, transforming the first atom database at runtime using the view to create a virtual atom database; and
    loading, by the first executable program and the second executable program, an atom from the virtual atom database, wherein the atom is shared by the first executable program and the second executable program,
    wherein each of the atoms includes a permanently assigned atom identifier, computer code and/or data, and references to other atoms.

2. The method of claim 1 wherein the new atom database is stored in a separate file from the first atom database.

3. The method of claim 1 wherein the new atom database replaces the first atom database.

4. The method of claim 1 wherein the transformation operations comprise:
    an insert operation to insert a new atom.

5. The method of claim 1 wherein the transformation operations comprise:
    a modify operation to modify an existing atom.

6. The method of claim 1 wherein the transformation operations comprise:
    a delete operation to delete an existing atom.

7. The method of claim 1 wherein the atom is loaded into a first memory buffer accessible by the first executable program and the atom is loaded into a second memory buffer accessible by the second executable program.

8. The method of claim 1 wherein the atom is loaded into a memory buffer accessible by both the first executable program and the second executable program.

9. The method of claim 1 wherein the transform operations are defined based on an optimization feature of a computer hardware and/or software system on which the atoms will execute.

10. The method of claim 1 wherein the transform operations are defined in order to limit access to certain features provided by the atoms.

11. The method of claim 1 wherein the atoms further comprise an atom characteristic and the atom transform operations change the atom characteristic.

12. The method of claim 1 wherein the set of transformation operations comprise only modify operations that replace a first atom with a second atom, such that a mapping table is created.

13. The method of claim 1 wherein the set of transform operations is applied to a virtual atom database.

14. The A method of creating views of a first atom database, comprising:
    associating a first view and the first atom database with a first executable programs, and a second view and the first atom database with a second executable program;
    defining a set of transformation operations;
    applying the set of transform operations to the first atom database, wherein the first atom database stores atoms;
    determining whether the transform operations are applied virtually or literally;
    if the transformation operations are applied literally, creating a new atom database, wherein the new atom database stores atoms;
    if the transformation operations are applied virtually. transforming the first atom database at runtime using the first view to create a first virtual atom database and the second view to create a second virtual atom database; and
    loading, by the first executable program using the first view and the second executable program using the second view, an atom from the first atom database, wherein the atom is shared by the first executable program and the second executable program,
    wherein each of the atoms includes a permanently assigned atom identifier, computer code and/or data, and references to other atoms.

15. The method of claim 14 wherein the atom is loaded into a first memory buffer accessible by the first executable program using the first view and the atom is loaded into a second memory buffer accessible by the second executable program using the second view.

16. The method of claim 14 wherein the atom is loaded into a memory buffer accessible by both the first executable program using the first view and the second executable program using the second view.

17. An apparatus for creating a view of a first atom database, comprising:
    a set of transformation operations; and
    a processor for:
        associating the view and the first atom database with a first executable program and a second executable program;
        defining a set of transformation operations;
        applying the set of transform operations to the first atom database, wherein the first atom database stores atoms;
        determining whether the transform operations are applied virtually or literally;
        if the transformation operations are applied literally, creating a new atom database, wherein the new atom database stores atoms;
        if the transformation operations are applied virtually, transforming the first atom database at runtime using the view to create a virtual atom database; and loading, by the first executable program and the second executable program, an atom from the virtual atom database, wherein the atom is shared by the first executable program and the second executable program, wherein each of the atoms includes a permanently assigned atom identifier, computer code and/or data, and references to other atoms.

18. An apparatus for creating a view of a first atom database, comprising:
- a means for associating the view and the first atom database with a first executable program and a second executable program;
- a means for defining a set of transformation operations;
- a means for applying the set of transform operations to the first atom database, wherein the first atom database stores atoms;
- a means for determining whether the transform operations are applied virtually or literally;
- a means for creating a new atom database based on a determination that the transformation operations are applied literally, wherein the new atom database stores atoms;
- a means for transforming the first atom database at runtime using the view to create a virtual atom database based on a determination that the transformation operations are applied virtually; and
- a means for loading, by the first executable program and the second executable program, an atom from the virtual atom database, wherein the atom is shared by the first executable program and the second executable program.

19. A computer program product comprising:
- a computer usable medium for creating a view of a first atom database;
- a set of computer program instructions embodied on the computer usable medium, including instructions to:
    - associating the view and the first atom database with a first executable program and a second executable program;
    - defining a set of transformation operations;
    - applying the set of transform operations to the first atom database, wherein the first atom database stores atoms;
    - determining whether the transform operations are applied virtually or literally;
    - if the transformation operations are applied literally, creating a new atom database, wherein the new atom database stores atoms;
    - if the transformation operations are applied virtually, transforming the first atom database at runtime using the view to create a virtual atom database; and
    - loading, by the first executable program and the second executable program, an atom from the virtual atom database, wherein the atom is shared by the first executable program and the second executable program,
    - wherein each of the atoms includes a permanently assigned atom identifier, computer code and/or data, and references to other atoms.

\* \* \* \* \*

UNITED STATES PATENT AND TRADEMARK OFFICE
CERTIFICATE OF CORRECTION

| | |
|---|---|
| PATENT NO. | : 7,281,017 B2 |
| APPLICATION NO. | : 10/178898 |
| DATED | : October 9, 2007 |
| INVENTOR(S) | : Matthew J. Hostetter and Benjamin R. Harrison |

It is certified that error appears in the above-identified patent and that said Letters Patent is hereby corrected as shown below:

Claim 14, col. 26, line 13, delete "The" at beginning of sentence.

Claim 14, col. 26, line 16, "programs" should read --program--.

Claim 18, col. 27, line 10, after "comprising" start new paragraph and insert --a processor;--.

Signed and Sealed this

Nineteenth Day of August, 2008

JON W. DUDAS
*Director of the United States Patent and Trademark Office*